US009806809B2

(12) United States Patent
Gros et al.

(10) Patent No.: US 9,806,809 B2
(45) Date of Patent: Oct. 31, 2017

(54) DEPLOYING LINE-OF-SIGHT COMMUNICATION NETWORKS

(71) Applicant: Facebook, Inc., Menlo Park, CA (US)

(72) Inventors: Andreas Gros, Mountain View, CA (US); Yael Maguire, Boston, MA (US); Karthik Yogeeswaran, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 158 days.

(21) Appl. No.: 14/534,690

(22) Filed: Nov. 6, 2014

(65) Prior Publication Data

US 2016/0134373 A1    May 12, 2016

(51) Int. Cl.
    *H04B 10/00*      (2013.01)
    *H04B 10/112*      (2013.01)
    *H04W 64/00*      (2009.01)
    *H04L 29/08*      (2006.01)

(52) U.S. Cl.
    CPC .... *H04B 10/1129* (2013.01); *H04L 29/08657* (2013.01); *H04W 64/00* (2013.01); *H04W 64/003* (2013.01)

(58) Field of Classification Search
    CPC .. H04B 10/1129; H04W 64/00; H04W 64/02; H04W 64/003; H04L 29/08657
    USPC .............. 398/156, 122, 129, 131; 455/456.1, 455/456.2, 456.3
    See application file for complete search history.

(56) References Cited

U.S. PATENT DOCUMENTS

| | | | |
|---|---|---|---|
| 6,640,145 B2 | 10/2003 | Hoffberg et al. | |
| 6,850,252 B1 | 2/2005 | Hoffberg | |
| 6,961,310 B2 | 11/2005 | Cain et al. | |
| 6,990,293 B2 | 1/2006 | Hu et al. | |
| 7,236,705 B2 * | 6/2007 | Moursund .......... | H04B 10/1123 398/129 |
| 7,436,887 B2 | 10/2008 | Yeredor et al. | |
| 8,046,313 B2 | 10/2011 | Hoffberg et al. | |
| 8,553,037 B2 | 10/2013 | Smith et al. | |
| 8,631,068 B1 | 1/2014 | Caldwell et al. | |
| 8,774,829 B2 | 7/2014 | Farley et al. | |
| 8,890,705 B2 | 11/2014 | Farley et al. | |
| 9,219,682 B2 | 12/2015 | Vasseur | |
| 9,300,612 B2 | 3/2016 | Bates | |
| 9,310,207 B2 | 4/2016 | Booij et al. | |
| 9,510,191 B2 | 11/2016 | Toksvig et al. | |
| 9,661,552 B2 | 5/2017 | Yogeeswaran | |

(Continued)

OTHER PUBLICATIONS

U.S. Appl. No. 14/311,125 by Toksvig, M., et al., filed Jun. 20, 2014.

(Continued)

*Primary Examiner* — M. R. Sedighian
(74) *Attorney, Agent, or Firm* — Perkins Coie LLP

(57) ABSTRACT

Various of the disclosed embodiments relate to line-of-sight (LOS), e.g., optical, based networks. Systems and methods for determining where to place and how to configure nodes in an optically connected network across a geographic region are provided. Various factors concerning the region may be collected, including, e.g.,: building locations and height, building types, population densities, backbone connection locations, recurring weather factors, geographic elevation, etc. The algorithm may iteratively place nodes based upon the accessible range of a preceding contemplated node position.

24 Claims, 30 Drawing Sheets

(56) References Cited

U.S. PATENT DOCUMENTS

| | | |
|---|---|---|
| 2006/0265508 A1 | 11/2006 | Angel |
| 2007/0083915 A1 | 4/2007 | Janakiraman et al. |
| 2007/0116471 A1* | 5/2007 | Bloom ............... H04B 10/1125 398/130 |
| 2007/0271339 A1 | 11/2007 | Katz |
| 2008/0086448 A1 | 4/2008 | Huh et al. |
| 2009/0121940 A1 | 5/2009 | Ladd et al. |
| 2009/0219941 A1 | 9/2009 | Cardozo et al. |
| 2010/0057541 A1 | 3/2010 | Bonner |
| 2010/0128695 A1 | 5/2010 | Nagaraja |
| 2010/0183053 A1 | 7/2010 | Tran et al. |
| 2010/0208621 A1 | 8/2010 | Morper |
| 2011/0035491 A1* | 2/2011 | Gelvin ................ H04L 67/12 709/224 |
| 2011/0106624 A1 | 5/2011 | Bonner |
| 2011/0116389 A1 | 5/2011 | Tao et al. |
| 2011/0228696 A1 | 9/2011 | Agarwal et al. |
| 2012/0015665 A1 | 1/2012 | Farley et al. |
| 2012/0173620 A1 | 7/2012 | Holostov et al. |
| 2013/0121686 A1 | 5/2013 | Voigt et al. |
| 2013/0164715 A1 | 6/2013 | Hunt et al. |
| 2014/0018095 A1 | 1/2014 | Parvizi |
| 2014/0039823 A1 | 2/2014 | Raghupathy et al. |
| 2014/0114738 A1 | 4/2014 | Tseng |
| 2014/0201280 A1 | 7/2014 | Qi et al. |
| 2014/0274122 A1 | 9/2014 | Tseng |
| 2015/0004903 A1 | 1/2015 | Lyman |
| 2015/0117318 A1 | 4/2015 | Qi |
| 2015/0235161 A1 | 8/2015 | Azar |
| 2015/0237207 A1 | 8/2015 | Ordille |
| 2015/0309155 A1 | 10/2015 | Belloni et al. |
| 2015/0373537 A1 | 12/2015 | Toksvig |
| 2016/0021586 A1 | 1/2016 | Akhi et al. |
| 2016/0134372 A1 | 5/2016 | Yogeeswaran et al. |
| 2016/0135110 A1 | 5/2016 | Yogeeswaran et al. |
| 2016/0374053 A1 | 12/2016 | Hareuveni |
| 2017/0223605 A1 | 8/2017 | Yogeeswaran et al. |

OTHER PUBLICATIONS

U.S. Appl. No. 14/333,353 by Ahki, F., et al., filed Jul. 16, 2014.
U.S. Appl. No. 14/511,579 by Maguire, Y., et al., filed Oct. 10, 2014.
U.S. Appl. No. 14/511,597 by Shen, S., et al., filed Oct. 10, 2014.
U.S. Appl. No. 14/534,675 by Yogeeswaran, K., et al., filed Nov. 6, 2014.
U.S. Appl. No. 14/534,709 by Yogeeswaran, K., et al., filed Nov. 6, 2014.
Non-Final Office Action mailed Oct. 26, 2015, for U.S. Appl. No. 14/511,597 of Shen, S., et al., filed Oct. 14, 2014.
Non-Final Office Action mailed Sep. 30, 2015, for U.S. Appl. No. 14/311,125 of Toksvig, M. et al., filed Jun. 20, 2014.
Requirement for Restriction mailed Dec. 3, 2015, for U.S. Appl. No. 14/511,579 of Maguire, Y., et al., filed Oct. 10, 2014.
Extended European Search Report mailed Jan. 22, 2016, for European Patent Application No. 15193353.8, 8 pages.
International Search Report and Written Opinion mailed Feb. 17, 2016, for International Application No. PCT/US2015/058869, 11 pages.
Final Office Action mailed Apr. 13, 2016, for U.S. Appl. No. 14/311,125 of Toksvig, M., et al., filed Jun. 20, 2014.
Non-Final Office Action mailed Jun. 1, 2016, for U.S. Appl. No. 14/534,709 of Yogeeswaran., et al., filed Nov. 6, 2014.
Non-Final Office Action mailed May 20, 2016, for U.S. Appl. No. 14/333,353 of Akhi, F., et al., filed Jul. 16, 2014.
Notice of Allowance mailed Aug. 12, 2016, for U.S. Appl. No. 14/311,125 of Toksvig, M., et al., filed Jun. 20,2014.
Notice of Allowance mailed Sep. 29, 2016, for U.S. Appl. No. 14/311,125 of Toksvig, M., et al., filed Jun. 20, 2014.
Final Office Action mailed Sep. 20, 2016, for U.S. Appl. No. 14/333,353 of Akhi, F., et al., filed Jul. 16, 2014.
Non-Final Office Action mailed Oct. 20, 2016, for U.S. Appl. No. 14/534,675 of Yogeeswaran, K., et al., filed Nov. 6, 2014.
Notice of Allowance mailed Jan. 19, 2017 for U.S. Appl. No. 14/534,709 of Yogeeswaran, K., et al., filed Nov. 6, 2014.
Non-Final Office Action mailed Apr. 11, 2017, for U.S. Appl. No. 14/333,353 of Akhi F., et al., filed Jul. 16, 2014.
Corrected Notice of Allowability mailed Apr. 11, 2017 for U.S. Appl. No. 14/534,709 of Yogeeswaran, K., et al., filed Nov. 6, 2014.
U.S. Appl. No. 15/493,045 by Yogeeswaran, K., et al., filed Apr. 20, 2017.
Notice of Allowance mailed May 23, 2017 for U.S. Appl. No. 14/534,675 of Yogeeswaran, K., et al., filed Nov. 6, 2014.
International Preliminary Report on Patentability mailed May 18, 2017, for International Application No. PCT/US2015/058869, 8 pages.
Supplemental Notice of Allowability dated Jun. 15, 2017 for U.S. Appl. No. 14/534,675 of Yogeeswaran, K., et al., filed Nov. 6, 2014.
Supplemental Notice of Allowability dated Jul. 20, 2017 for U.S. Appl. No. 14/534,675 of Yogeeswaran, K., et al., filed Nov. 6, 2014.
Final Office Action dated Aug. 2, 2017 for U.S. Appl. No. 14/333,353 of Akhi, F. et al. filed Jul. 16, 2014.

* cited by examiner

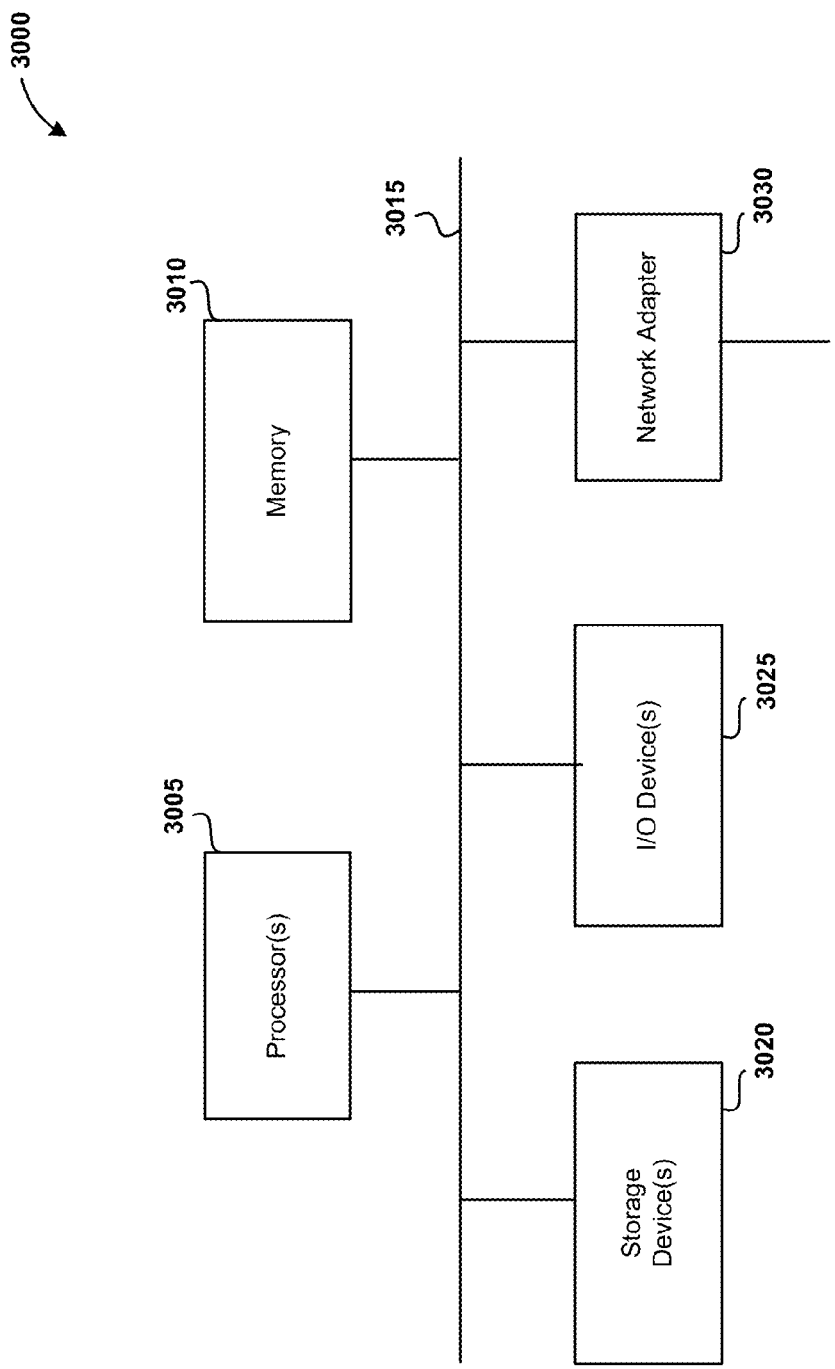

DEPLOYING LINE-OF-SIGHT COMMUNICATION NETWORKS

TECHNICAL FIELD

The disclosed embodiments relate to deployment and operation of line-of-sight (LOS) networks, e.g., for providing wireless Internet access.

BACKGROUND

Modern society relies heavily upon the rapid dissemination of large amounts of information. Whether via the Internet or via community intranets, participation in the global community is regularly predicated upon network connectivity. Individuals and communities that cannot access these networks are at a considerable disadvantage as compared to their networked peers. Not only do disconnected communities lack access to information and services provided by the rest of the world community, but they also generally lack the infrastructure to improve intra-community communication as well.

While the need for Internet or local network access may be great in these communities, geographic and economic limitations may render typical delivery mechanisms unfeasible. Furthermore, these communities may lack the financial resources to support the introduction of high-bandwidth routers and access points provided by commercial conglomerates.

Accordingly, there exists a need for an economical method to introduce network access to communities in disparate geographic conditions.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 30 is a block diagram of a computer system as may be used to implement features of some of the embodiments.

Figure 1:
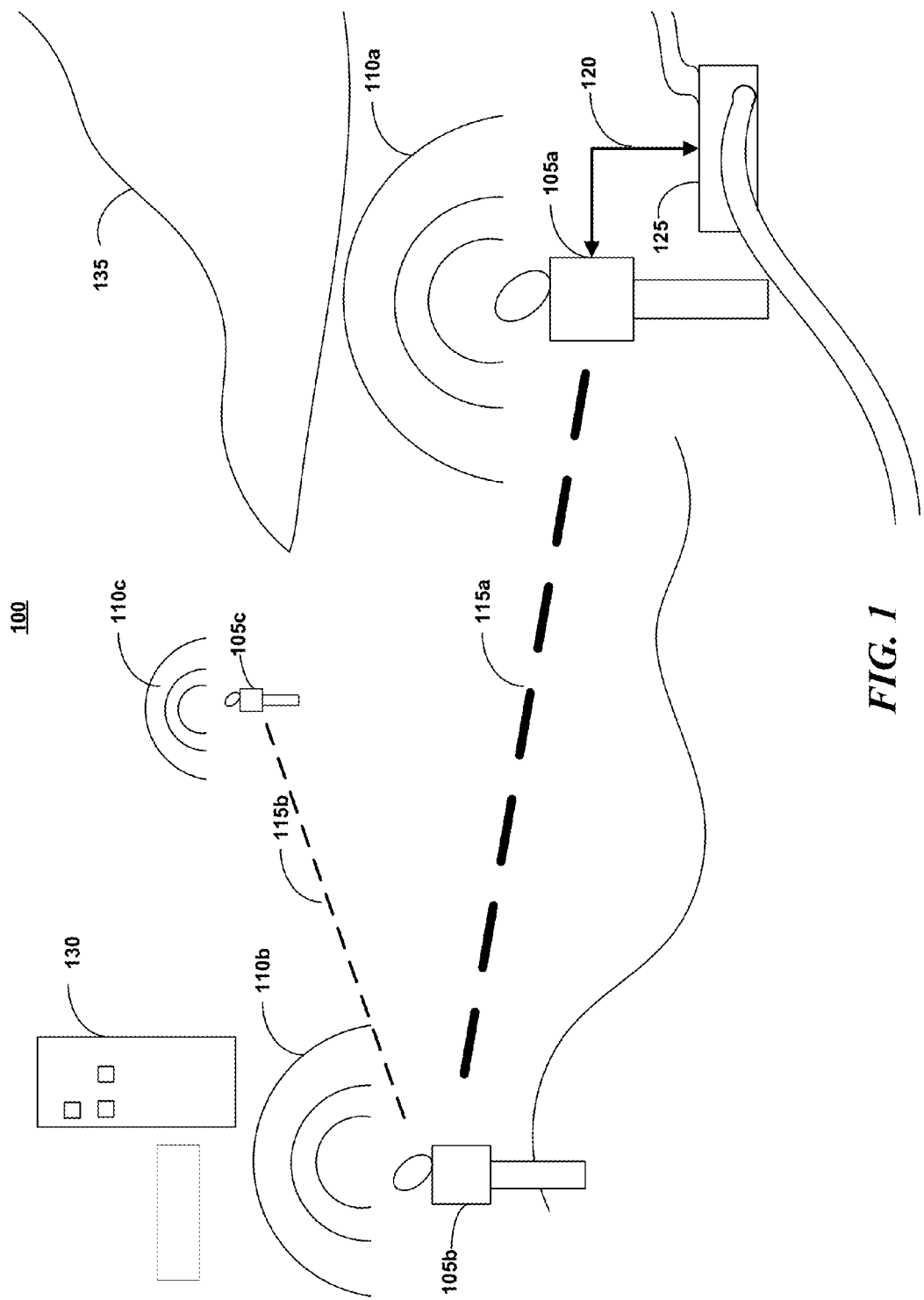
FIG. 1 is an in-situ image of a deployed optical network as may occur in some embodiments.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

General Description

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Network Overview

Various of the disclosed embodiments relate to line-of-sight (LOS), e.g., optical, based networks. Systems and methods are provided for determining where to place the network nodes in a geographic region, aligning the nodes with their peers, and then associating peers so as to achieve the desired network topology. Some of the disclosed embodiments may be used to provide Internet access to remote regions and communities. By combining local and holistic priorities at different stages of the network deployment, a robust and efficient LOS network may be formed.

FIG. 1 is an in-situ image of a deployed optical network 100 as may occur in some embodiments. A plurality of nodes 105a-c may be in local communication with one another via LOS connections 115a,b. Each node may provide network access 110a-c, e.g. via wireless WIFI access, to its local region. Some nodes may be connected to a backbone 125, such as a fiber backbone (though other backbones are possible), that may be connected to the Internet. While placed so as to provide a desired access to the population of a community, the nodes can also be situated so as to accommodate the presence of natural obstacles 135 and man-made obstacles 130.

Hardware

Figure 2:
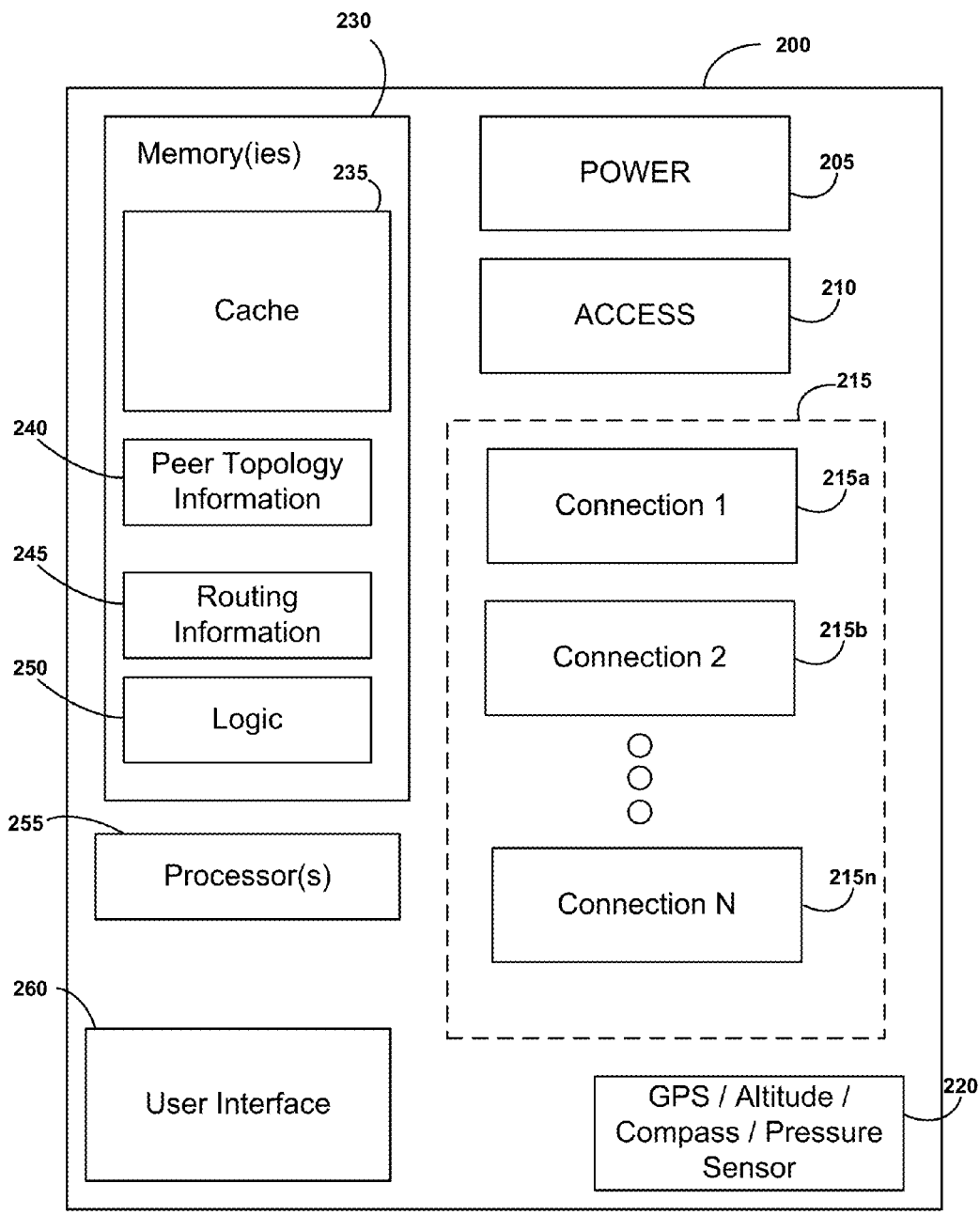
FIG. 2 is a block diagram of some components in a node as may occur in some embodiments.

FIG. 2 is a block diagram of some components in a node 200 as may occur in some embodiments. Power module 205 may be any suitable connection to a power source, e.g., a connection to a land-based power source (a grid-based alternating current), to a solar cell, to a battery source, to a voltage difference in a natural medium, etc. Network access module 210 may be a component in the node 200 used to provide local network access. For example, network access module 210 may be a WIFI wireless access point, a wired Ethernet terminal, etc. Connection bay 215 may include a plurality of connection modules 215a-n for communication with peer nodes. Connection modules 215a-n need not be the same form of communication, e.g., they may be microwave, line-of-sight optical, laser-based, radio-frequency, directional antenna systems, hardline connections, etc. The connection modules 215a-n may have different bandwidths and communication rates. Connection modules 215a-n may include both transmission and reception components and may be associated with a same or different peer node. Some connection modules 215a-n may be specifically designed for communication with a backbone. Connection modules 215a-n may include individual or shared actuators for alignment and directional transmission/reception.

Location module 220 may include one or more components used for determining location and/or orientation, such as a GPS reception system, a compass, an altimeter, a pressure sensor, etc. The pressure sensor may be used to acquire relative barometric measurements as compared with peer nodes as described further herein. Memory module 230 may include one or more memory devices, which may be solid-state memories, hard disk memories, etc. A cache 235 may be used for storing user-requested information as discussed in greater detail herein. Peer topology information 240 may include a record of peer locations, their ranking relative to a backbone node, etc., for example as determined during Association, as discussed herein. Routing information 245 may include protocols for sending information via different peers based upon channel conditions, traffic load, weather conditions, network load, etc. Logic 250 may include operational logic to maintain connection modules 215a-n, to forward and redirect information to users, to generally maintain the operation of node 200, etc. One or more processors 255 may be used to run the logic 250. Though this example depicts a common memory-processor instruction architecture, one will readily recognize that the described operations may be implemented using other tools, e.g., Field-Programmable Gate Arrays (FPGAs). A user interface 260 may be included for an in-field operator or for users to interact with the node 200, e.g., to designate its mode of operation, to configure its position, to receive data, etc.

In some embodiments, the connection modules 215a-n may include a backhaul subsystem module. The backhaul subsystem may be designed to carry a large data rate from node to node and may share a fraction of the capacity at each node with the access subsystem. The backhaul subsystem link to neighboring nodes may be designed to carry large amounts of data capable of supplying many access subsystems. This may facilitate the chaining of many such nodes together. In some embodiments, the nodes are seldom repositioned following deployment. There may be some small movement of a node due to buildings settling and temperature variation but larger movements may occur when a node is to be physically moved to another site, e.g., for environmental reasons.

The access module 210 may be designed to share connectivity with both mobile and fixed end user devices in the area immediately surrounding the node (and perhaps to users closer to this node than to other peer nodes). The access subsystem may use wide area coverage wireless technologies to connect with many end users in its vicinity. Rather than a physical fiber, the backhaul subsystem may utilize narrow beam communication systems (optical, RF with high gain antennas, etc.) to pass high data rates to neighboring nodes efficiently and to minimize communication interference between other backhaul nodes.

The narrow beam technologies used for the backhaul subsystem may include (but are not limited to), RF, millimeter wave, and optical. Beam divergences for the backhaul subsystem may be approximately 3-5 degrees for RF systems, 1-3 degrees for millimeter wave systems, and 0.05 to 0.5 degrees for optical systems, though these ranges are offered as examples and one will readily recognize that others are possible.

Building sway, building settling, temperature drift, etc. may affect the viability of these different ranges. Such changes induced on an aligned system may induce small changes of a fraction of a degree. In some embodiments, this motion may be handled with small field of view steering technologies or aligning the devices to the beam centers such that the movement is within the beam divergence angle. During the installation process the backhaul subsystem may need to search over an angular range of 180 degrees in the X-Y plane and 30 degrees in the Z axis to locate a nearby node to connect to.

Figure 3:
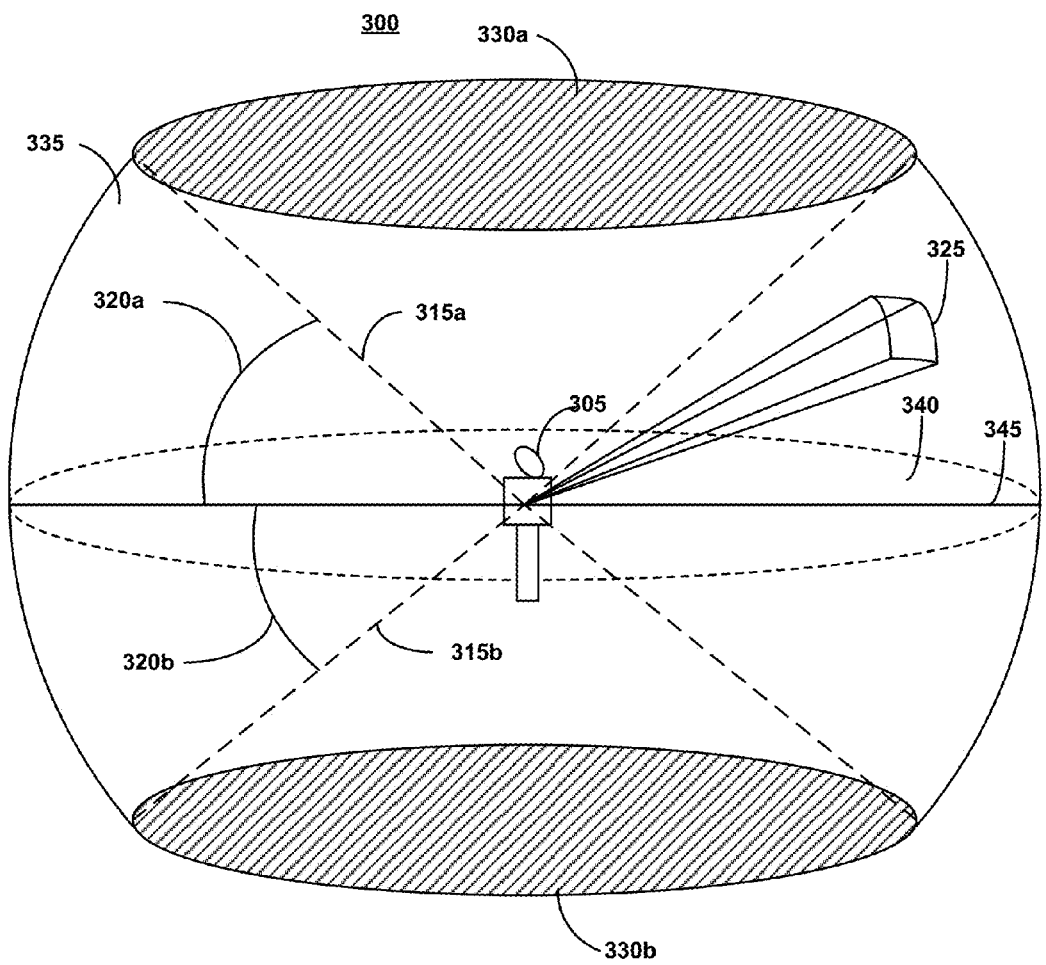
FIG. 3 is three-dimensional depiction of the line-of-sight angles and ranges relevant to a node as may occur in some embodiments.

FIG. 3 is three-dimensional depiction of the line-of-sight (LOS) angles and ranges relevant to a node 305 as may occur in some embodiments. Depending upon the actuator configuration a node 305 may be able to orient its LOS transmitter/receiver within an LOS region 335 having a range 345. The node 305 may be able to rotate a full 360° about a vertical access (i.e., yaw axis). This region may extend from a plane 345 about a horizontal axis (i.e., pitch axis) to a maximum angle 320a above the plane 340 and a maximum angle 320a below the plane 340. Regions 330a,b may accordingly be excluded from the node 305's visibility at boundaries 315a,b. These regions are not necessarily to scale and will change with various embodiments (e.g., the region 330a may be a null region and the zenith accessible to the node 305's visibility in some embodiments). A radius 345 may depend upon the hardware of the node 305 and the transmission channel conditions (e.g., humidity, interference from other sources, etc.). A window 325 may reflect the actual region seen by the node 305 (multiple such windows may be present for different devices) at a given position along the range 345. The window is here seen increasing in dimensions along the range as a consequence of the divergence factor. As the window 325 may be relatively narrow, accurate identification of neighboring peer node positions may be necessary if communication is to be established with them in a reasonable period. Absent such information, the node 305 may scan the window 325 across a region far from the peer node.

Note that the LOS ranges depicted herein may be unrelated to the wireless access ranges, radiofrequency, and/or microwave communication methods of other modules.

Deployment Overview

Figure 4:
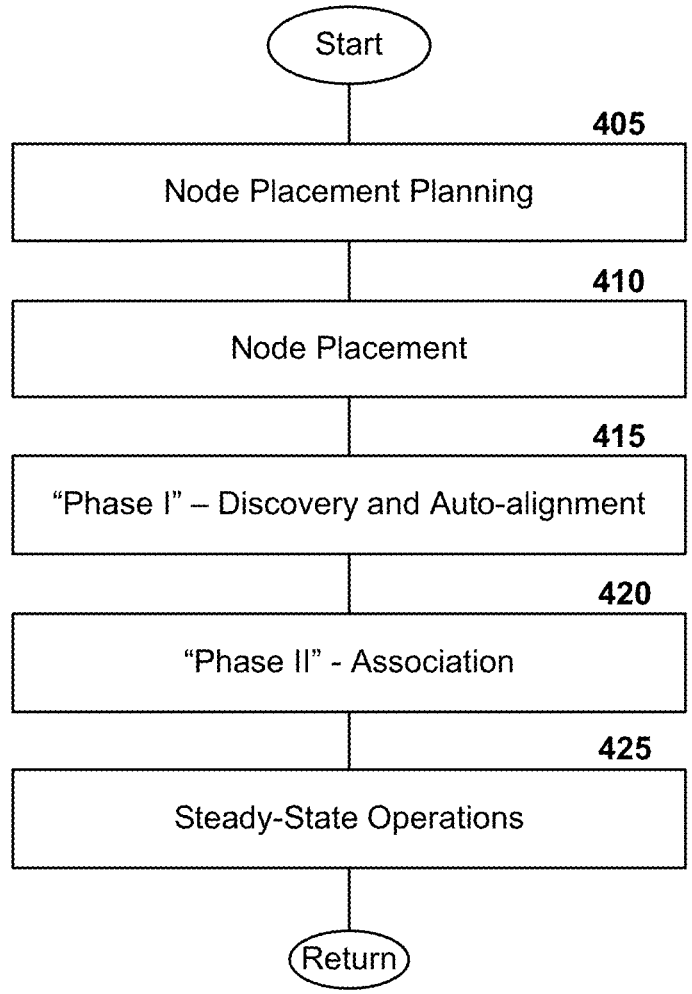
FIG. 4 is a flow diagram depicting a very high-level example deployment and operation of a node network as may occur in some embodiments.

FIG. 4 is a flow diagram depicting a very high-level example deployment and operation of a node network as may occur in some embodiments. At block 405 the node placement may be determined in a simulated environment. During this stage, one or more planners may identify the best physical and logical topologies for the nodes in a given geographic and population context. Example aspects of this operation are discussed in greater detail herein, e.g., in the sections with heading "Node-Placement Planning".

At block 410 the nodes may be physically placed in the geographic region. A dedicated group of technicians may install the nodes, or the nodes may be established in an ad-hoc manner by members of the community. For example, nodes may be mailed to participating community members with instructions for their installation.

At block 415 the nodes may engage in Discovery and Alignment procedures to locate and orient towards their peers. During this stage, the nodes may determine the relative physical location of their nearest peers and the orientations necessary to perform line-of-sight communication with one or more of those peers. Example aspects of this operation are discussed in greater detail herein, e.g., in the sections with heading "Discovery and Alignment".

At block 420 the nodes may engage in Association to determine their topological relation relative a backbone. During this stage, the nodes may determine which of their neighbors they should form LOS connections with so as to acquire access to a network backbone. The backbone may be a connection to the Internet or to a subnetwork. These formations may prevent node subgroups from being isolated from the backbone connection. Example aspects of this operation are discussed in greater detail herein, e.g., in the sections with heading "Association".

At block 425 the nodes may perform various steady-state operations, including, e.g., routing, network management, data caching, etc.

Node-Placement Planning

Figure 5:
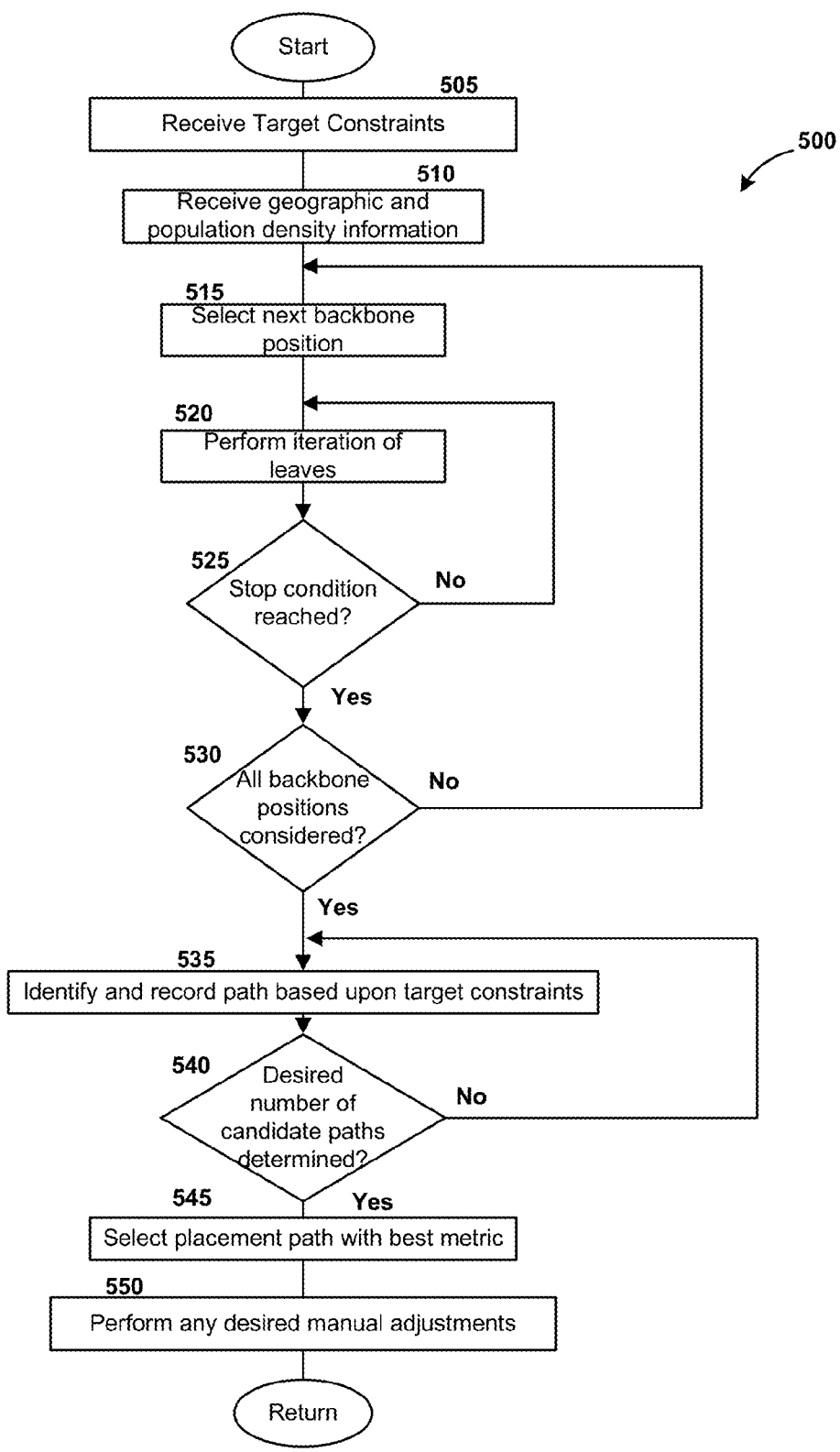
FIG. 5 is a flow diagram depicting operations in a node-placement-planning algorithm as may occur in some embodiments.

FIG. 5 is a flow diagram depicting operations in a node-placement-planning algorithm as may occur in some embodiments. At block 505, the system may receive various target constraints. For example, the planners of the network may specify the maximum number of nodes available, the desired coverage per region, prioritization of certain communities or areas, the iteration parameters discussed in greater detail herein, etc.

At block 510, the particular, real-world information for a target region may be provided. This information may include the population distribution of the target region (averaged, or for different temporal periods), the obstacles (natural and man-made) in the region, the elevation of portions of the region, the location of a backbone connection, etc.

At block 515, the system may select the next backbone connection to be considered. For example, a plurality of connection points may be specified along the backbone at regular intervals. Each point may afford various benefits and/or drawbacks. For simplicity of explanation, consideration of a single backbone connection at a time is discussed here, but one will readily recognize that the discussed methods may be extended to approaches in some embodiments where multiple backbone connections are considered simultaneously.

At block 520, the system may perform an iteration among the leaves of the presently considered backbone. Initially, there may be only a single leaf (the backbone connections), but proposed peers will be generated during this step based on various of the provided parameters. These proposed peers may themselves serve as leaves during a subsequent iteration to generate additional peers/leaves.

At block 525, the system may determine if a stop condition has been reached. For example, where each of the contemplated paths has exhausted the maximum available number of nodes, the system may conclude the generation process. Similarly, if a desired level of coverage were specified and a path provides this coverage, leaves may no longer be generated for the path. One will recognize that the system may continue generating leaves for those nodes associated with paths that have not yet met a stop condition, even though other paths may have met the condition. In some embodiments, local minima may be avoided by ignoring a stop condition, but making a record of it having been met for a given path (this may generate a new path in itself, e.g., a subpath of the larger path). For example, this may prevent a path that satisfies a lower prioritized stop condition (e.g., preferred cost) from preventing the generation of path satisfying a higher prioritized stop condition (e.g., desired coverage achieved).

At block 530, the system may determine if all the backbone positions have been considered. If not, the system may generate a new series of nodes and paths for the next backbone connection. These may be separately considered from those generated in the previous backbone node iteration, or the synergies between the paths may be considered below at block 535.

At block 535, the system may identify and record paths based upon the target constraints. For example, whereas the constraints may have previously dictated that no further leaves be generated, the constraints are here used to "prune" the possible connections to identify those paths associated with the highest metric values. For example, for a tree with a branching factor of 3, wherein 5 iterations were performed, there may be as many as 364 nodes (1+3+9+27+81+243) to consider (this is merely an example and many more than 5 iterations may be performed, and a different branching factor than 3 may be used, in some embodiments). Of these 364 nodes, 243 nodes may be leaves (the remaining nodes being intermediate nodes to the backbone). For each of these 243 leaves, there may be one or more possible paths (based upon the LOS limitations for neighboring nodes) to the backbone. There may also be many subpaths from the intermediate nodes to the backbone. Metric determinations based on the constraints (e.g., cost, coverage achieved, difficulty of installation, etc.) may be determined for each of these paths.

At block 540, the system may determine if the desired number of paths has been determined. If not, additional paths and their corresponding metrics may be determined. Once the desired number of paths has been identified, at block 545, the system and/or human planner may select one or more paths associated with preferred metric values. The planner may adjust the node positions manually at block 550 to generate the final node topology for in-situ installation.

Node-Placement Planning—Iteration Leaf Representation

Figure 6:
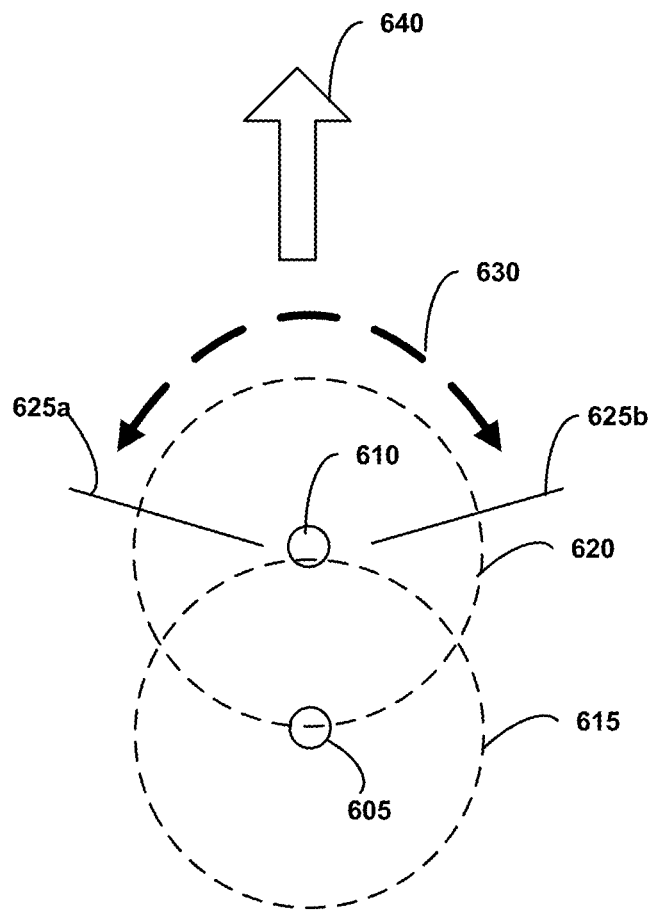
FIG. 6 is a top-down, two-dimensional depiction of the line-of-sight angles and ranges relevant to a node during the path planning algorithm as may occur in some embodiments.

FIG. 6 is a top-down, two-dimensional depiction of the line-of-sight angles and ranges relevant to a node during the path planning algorithm as may occur in some embodiments. Although a data structure reflecting these variables may appear in the planning system, the two-dimensional representation of FIG. 6 is merely to facilitate explanation, and one will readily recognize that the system anticipates the three-dimensional structure of FIG. 3 when assessing peer-to-peer interactions.

During an iteration of the peer generation aspect of the placement process, the system may consider a previously-placed node 605 and its child node 610, which is presently a leaf considered in this iteration. Here, the LOS ranges of the nodes are depicted by range circles 615 and 620, although as discussed previously, the system may consider the three-dimensional character of the ranges and limitations imposed by terrain, hardware, etc. Child node 610 was previously placed at the periphery of node 605's LOS range. To now place one or more leaves relative to child node 610, the system may consider a priority direction 640 and span 630 with limits 625a and 625b. The span need not be along a circle, but may be a line path along the periphery of whatever form child node 610's visibility assumes. Candidate child nodes may be placed along this span 630 in accordance with a desired branching factor. Priority direction 640 may determine the width of span 630 (e.g., based on the distance to a weighted centroid, the variance about the weighted centroid, local topology around the priority direction, etc.) and the limits 625a and 625b and be generated based upon one or more constraints. For example, where the system seeks to service a maximum number of communities, the system may identify centroids in the population density, weight the centroids by priority and then determine the priority direction 640 based upon the relationship between the position of child node 640 and the weighted average (in this example, the weighted average would be in the direction of the top of the page).

Node-Placement Planning—Example Iterations

Figure 7:
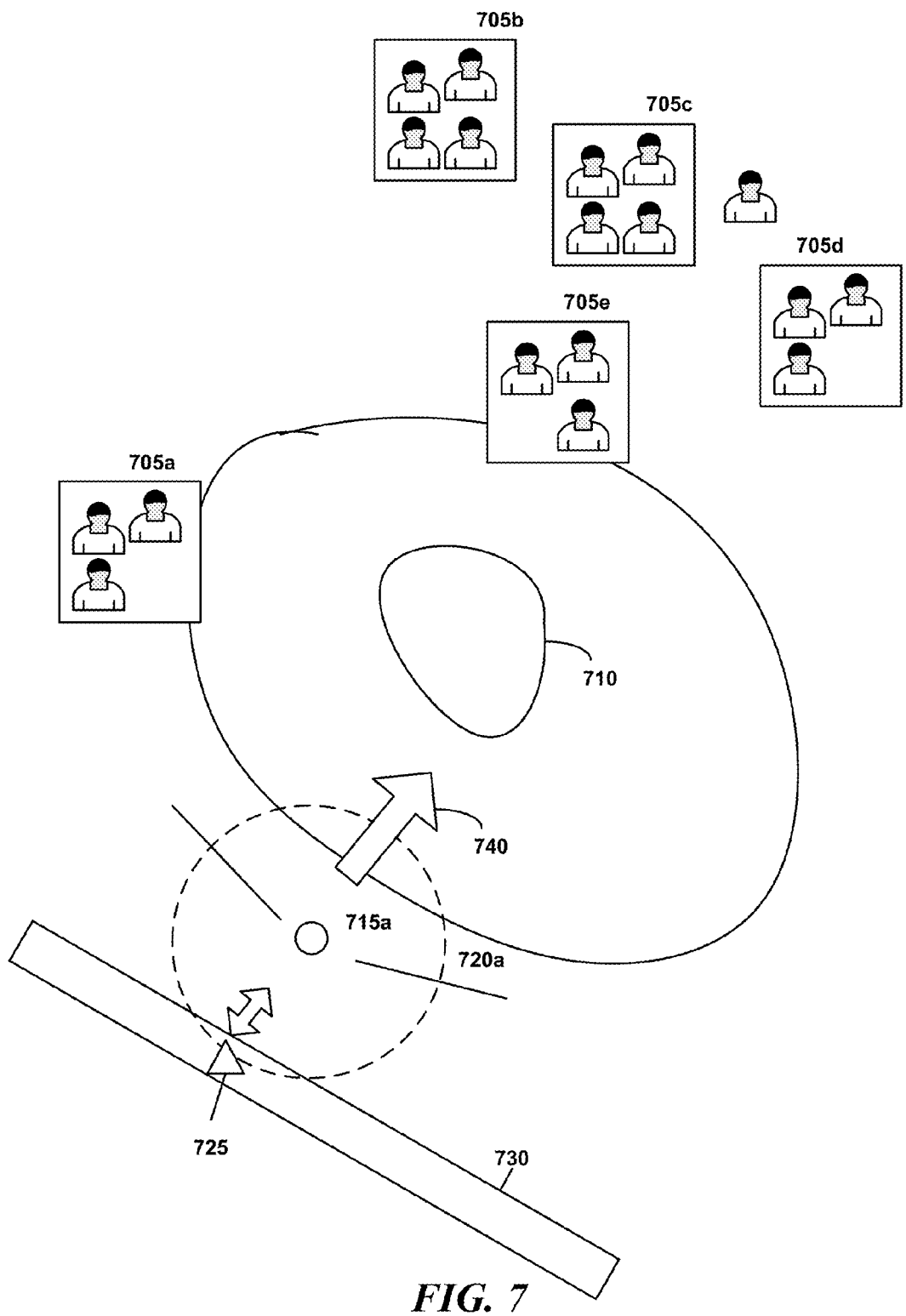
FIG. 7 is an example iteration of a node-placement-process as may occur in some embodiments.

FIG. 7 is an example iteration of a node-placement-process as may occur in some embodiments. Population density data may have indicated that community members frequent regions 705a-e. Some of these regions 705b-e, e.g., an office complex or downtown center, may be grouped closely together. Other regions 705a may be isolated, e.g., depicting isolated villages, service stations, etc. Elevation data may indicate that a large mountain 710 is present in the region.

Given this particular, real-world information for the target, the system may seek to identify an optimal node placement providing network access to the various regions, beginning from a backbone 730. A connection point 725 may serve as an initial node in the contemplated network. In this example a first node 715a, has been placed within optical range of the connection point 725. In this simplified example, the system has identified the priority direction 740, e.g., based upon a desire to service the community reflected by regions 705b-e. For each leaf generation iteration, the system may also iterate across different constraint profiles to consider different priority directions 740 (though, for simplicity, only one direction is considered here—considering multiple priority directions at each iteration may generate many more than the 364 nodes presented in the example above).

Figure 8:
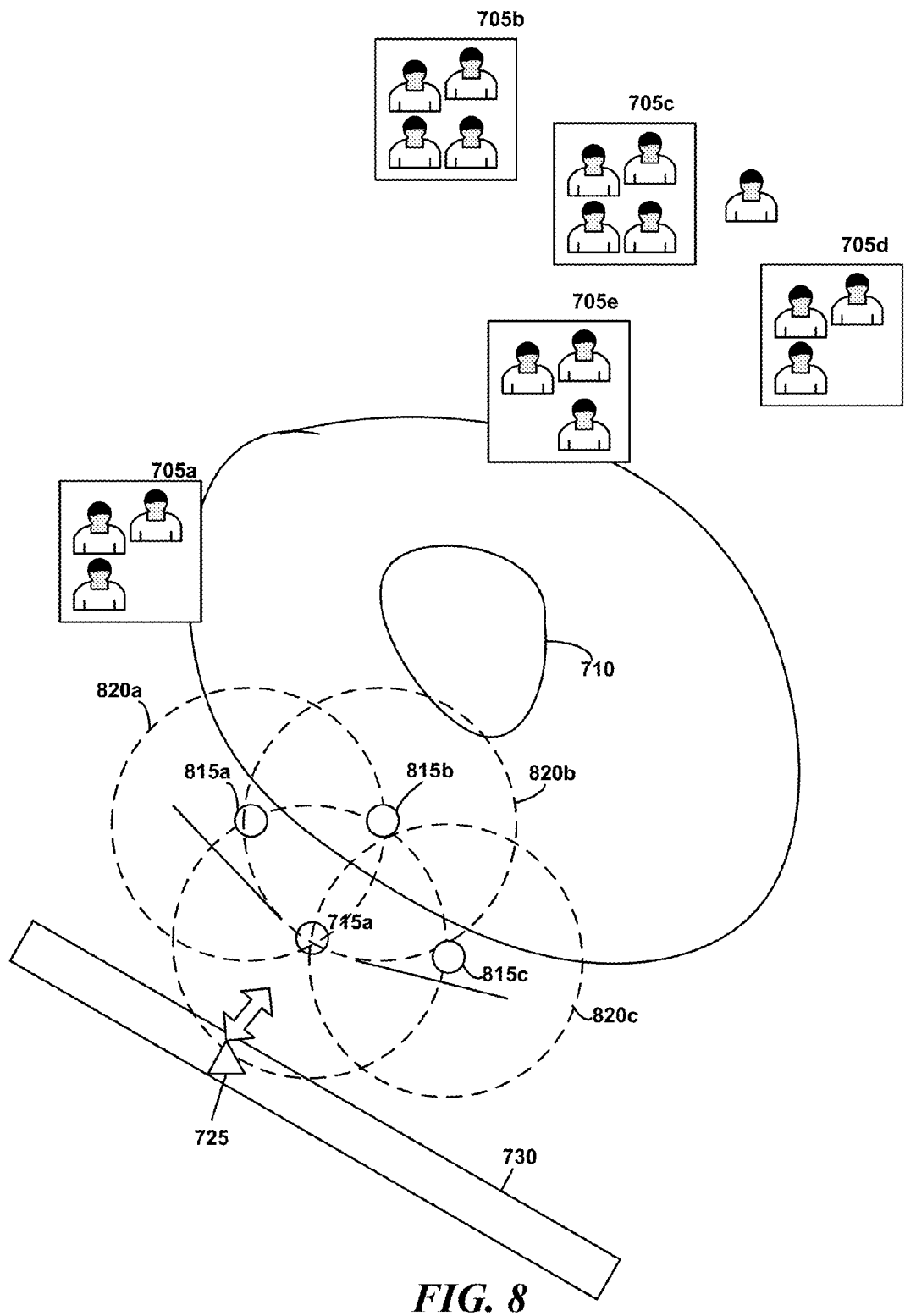
FIG. 8 is an example iteration of the node-placement-process of FIG. 7.

FIG. 8 is an example iteration of the node-placement-process of FIG. 7. Here, for a branching factor of 3, the system has placed three new leaf nodes 815a-c. As indicated, each of these leaf nodes 815a-c offer different advantages/disadvantages. Node 815a may ultimately provide access to region 705a at lower cost than the other options. Node 815b however, may provide the most direct path the regions 705b-e. Node 815c may avoid certain limitations of elevation, but moves farther from the populated regions.

Figure 9:
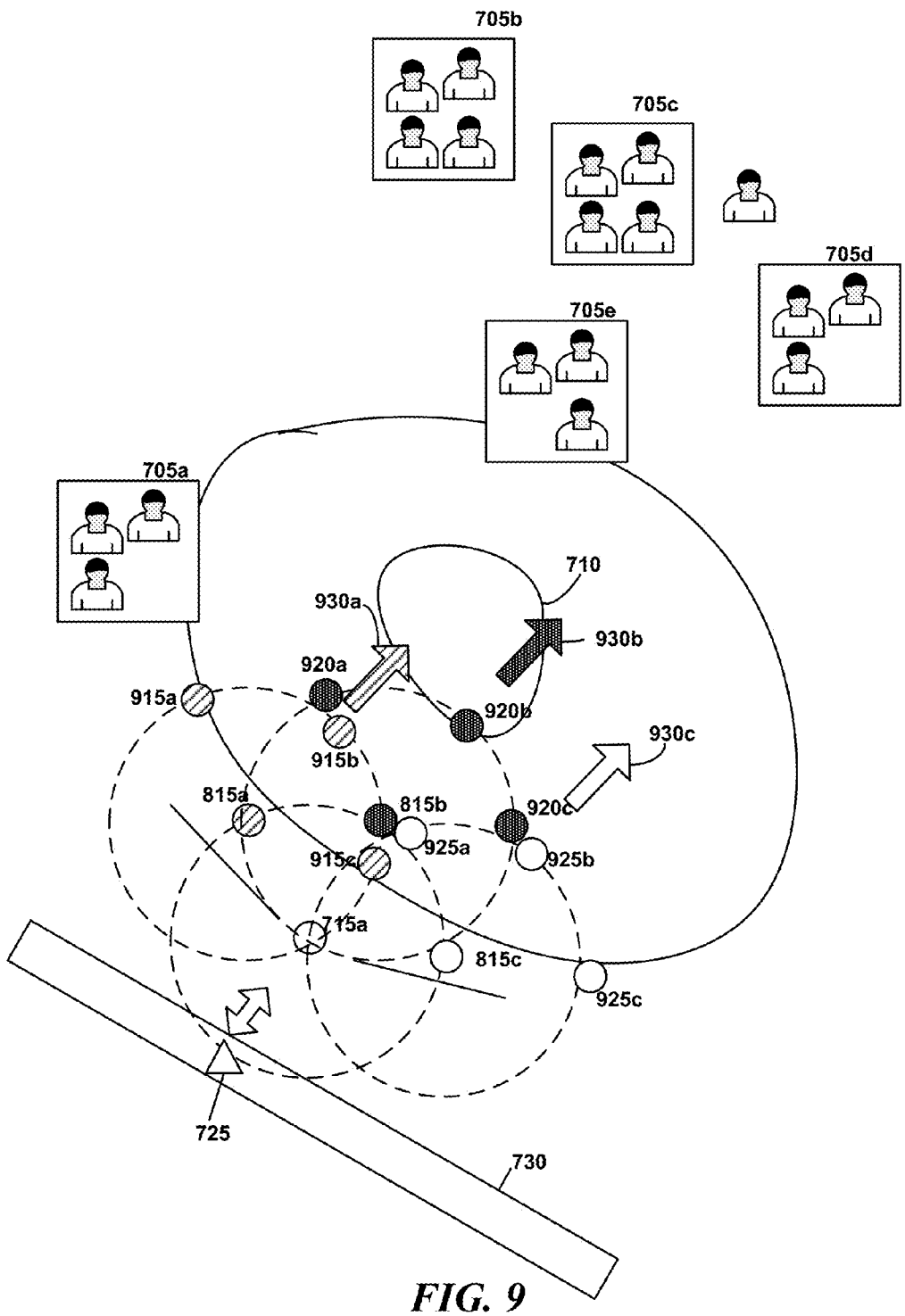
FIG. 9 is an example iteration of the node-placement-process of FIG. 7 depicting the effect of a holistic directional growth criterion as may occur in some embodiments.

FIG. 9 is an example iteration of the node-placement-process of FIG. 7 depicting effects of a holistic directional growth criterion as may occur in some embodiments. For example, leaves have been generated for each of node 815a-c in accordance with the constraints and consequent priority directions 930a-c. The priority directions 930a-c need not be the same (though they are in this example) and may vary in a "greedy manner" depending upon how the constraints interpret the current node's situation. In this example, the new leaf nodes 915a-c, 920a-c, 925a-c have been generated pursuant to a "holistic" priority to reach the largest serviceable population, i.e., regions 705b-e.

Figure 10:
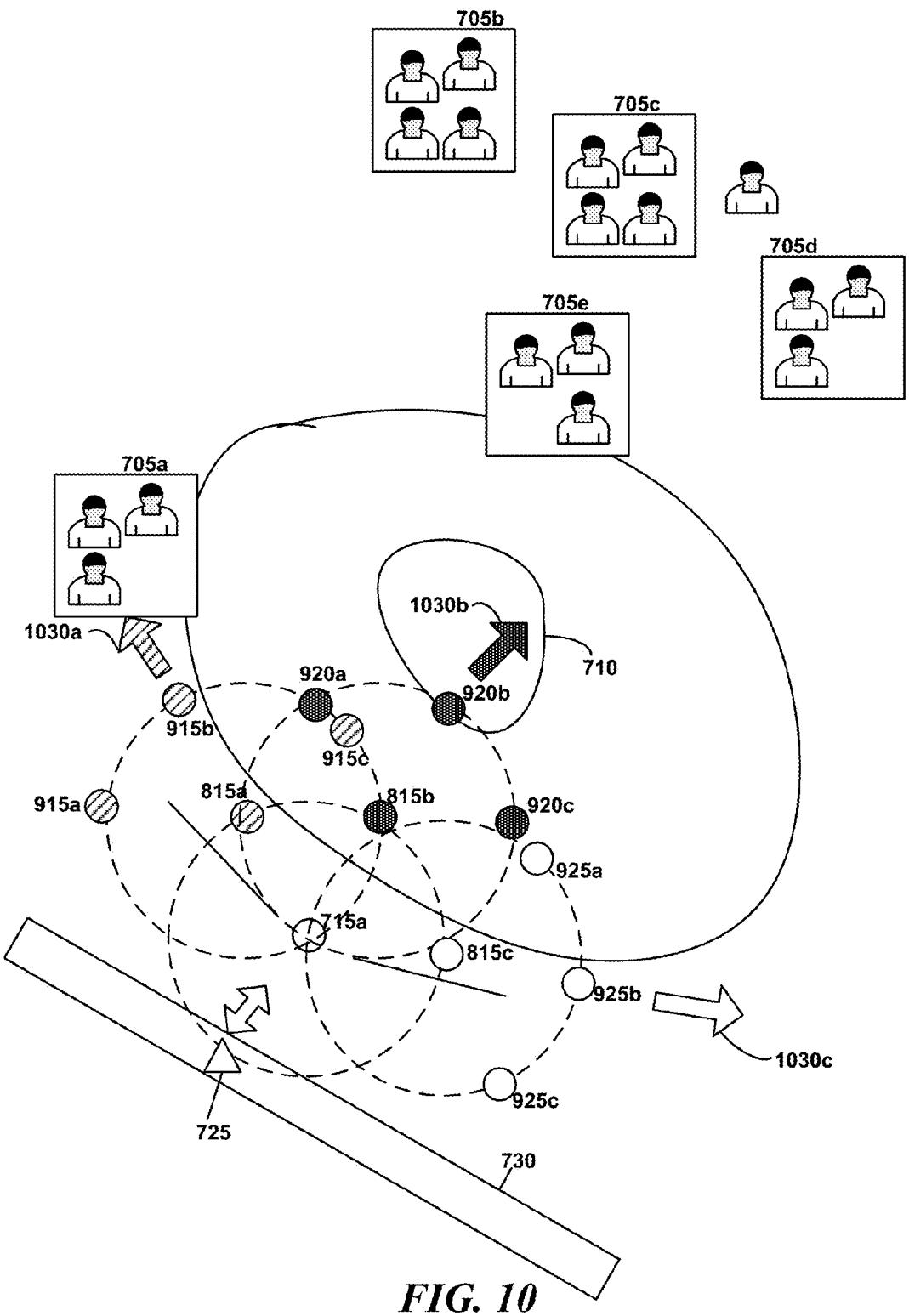
FIG. 10 is an example iteration of the node-placement-process of FIG. 7 depicting the effect of a greedy directional growth criterion as may occur in some embodiments.

FIG. 10 is an example iteration of the node-placement-process of FIG. 7 depicting effects of a greedy directional growth criterion as may occur in some embodiments. In contrast to the preceding example, the priority directions 1030a-c have been reevaluated locally for each node 815a-c. Here, node 815a's potential to reach region 705a has predominated the other constraints/priorities and the priority direction 1030a adjusted accordingly. Similarly, node 815b's potential to reach regions 705b-e and/or its ability to reach a higher elevation (and possibly children with greater LOS range) has predominated the other constraints/priorities. Accordingly, priority direction 1030b has been adjusted. In some instances, the rules governing creation of the priority direction may consider the presence of other nodes and priority directions. For example, priority direction 1030*c* may be generated because the region to the bottom right remains unexplored by the other paths. Weights corresponding to different priorities may be adjusted such that the priority directions and consequent leaves generated with each iteration provide a desirable diversity of path options for consideration.

Figure 11:
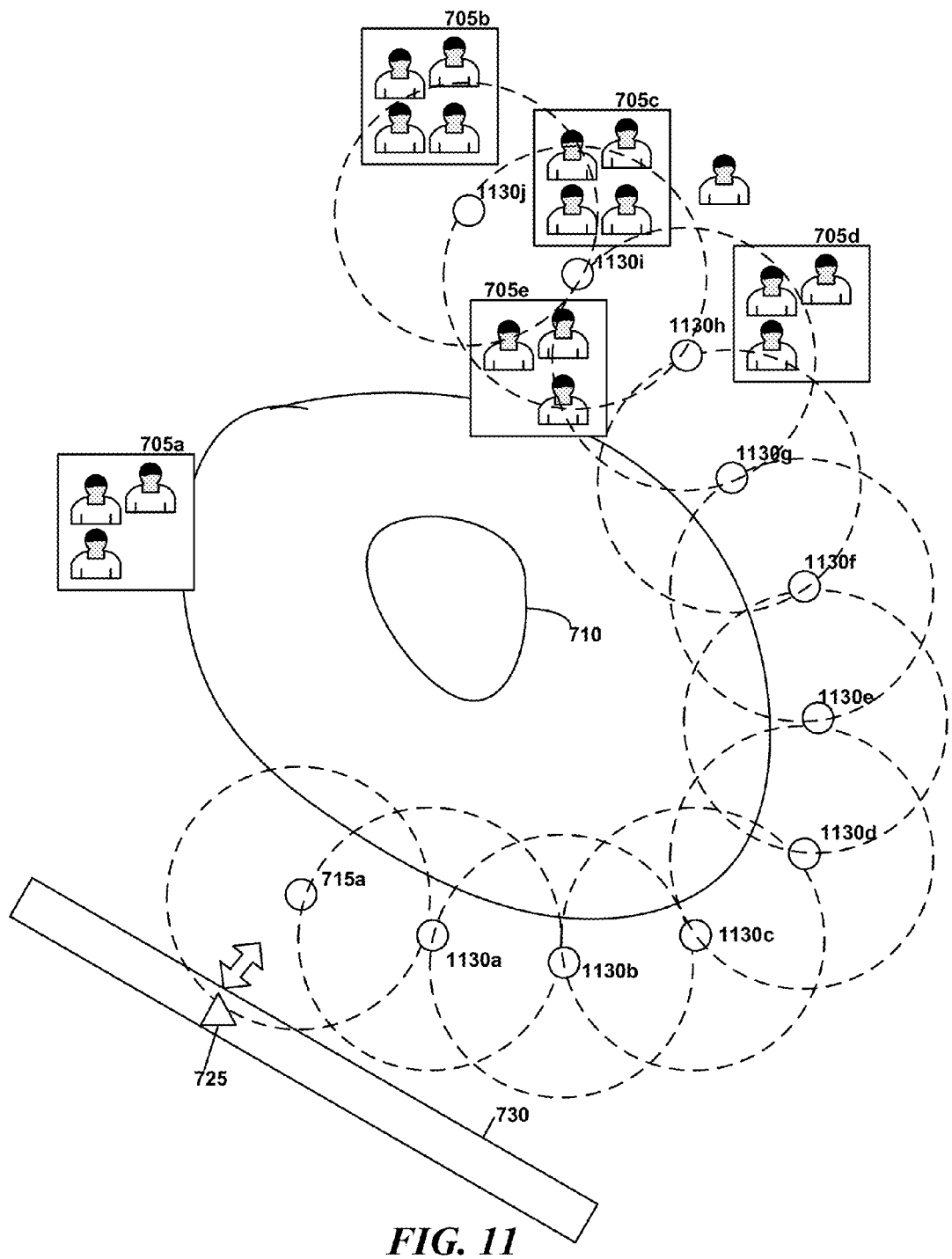
FIG. 11 is an example resultant path of the node-placement-process of FIG. 7 as may occur in some embodiments.

FIG. 11 is an example resultant path of the node-placement-process of FIG. 7 as may occur in some embodiments. Node placement may continue until a stop condition is reached as discussed herein. The system may then identify all the viable paths among the placed nodes and then assign them appropriate metrics. For example, FIG. 11 depicts a path from the backbone via nodes 1130*a-j* to regions 705*b-e*. This path may receive a relatively lower-valued metric as it requires a considerable number of nodes and fails to service the region 705*a*.

Figure 12:
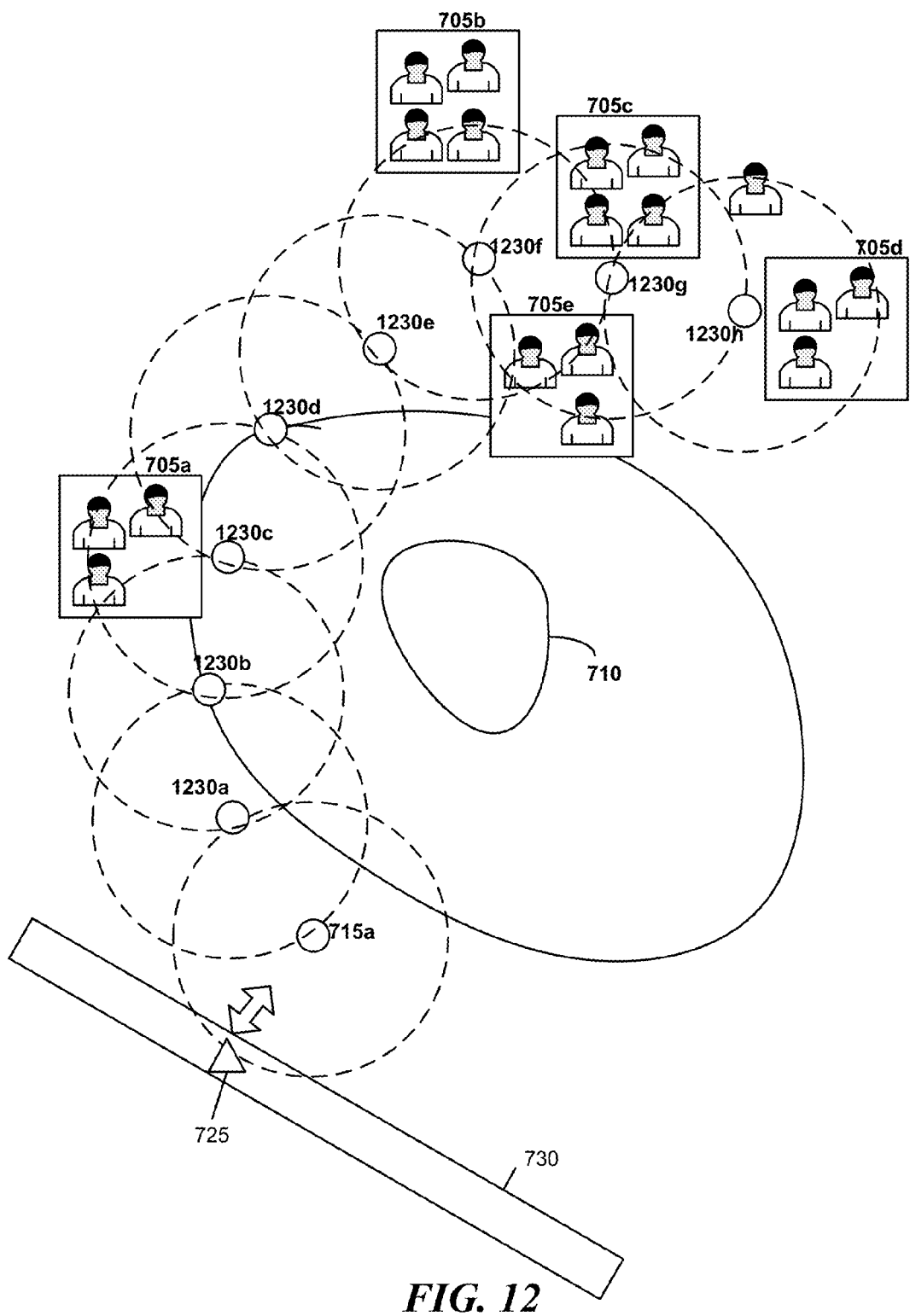
FIG. 12 is an example resultant path of the node-placement-process of FIG. 7 as may occur in some embodiments.

FIG. 12 is an example resultant path of the node-placement-process of FIG. 7 as may occur in some embodiments. This example path may receive a higher relative metric value than the example of FIG. 11 as the nodes 1230*a-h* service all the regions 705*a-e*. However, this path still requires a rather large number of nodes.

Figure 13:
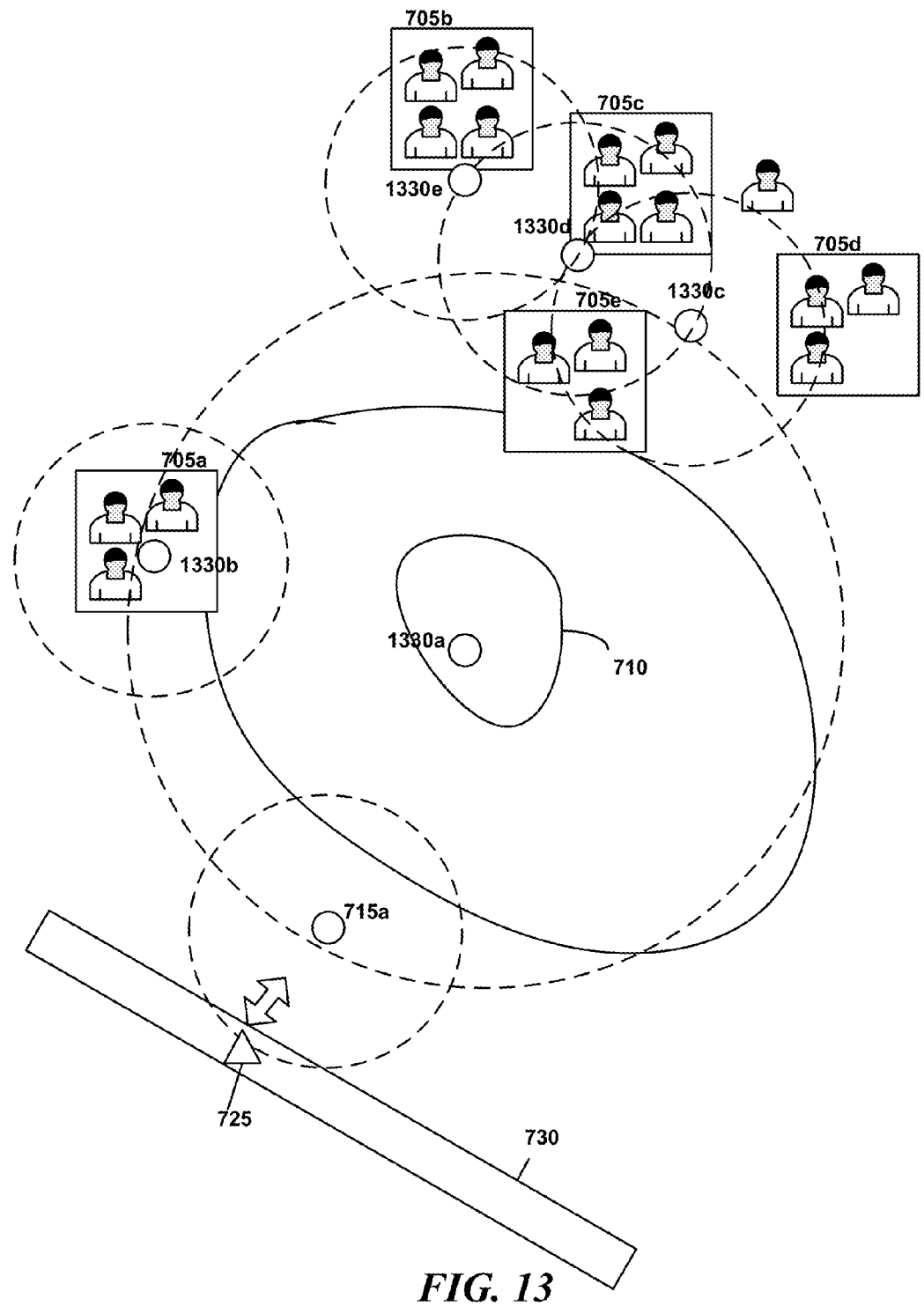
FIG. 13 is an example resultant path of the node-placement-process of FIG. 7 as may occur in some embodiments.

FIG. 13 is an example resultant path of the node-placement-process of FIG. 7 as may occur in some embodiments. This example demonstrates that pruning may not only remove nodes outside the considered path, but may remove nodes within a considered path, if they are deemed irrelevant. For example, the system has discovered that placement of a node 1330*a* atop the mountain 710 permits it extend its LOS range considerably. In fact, strategically placed periphery nodes 1330*b* and 1330*c* permit the network to service each of regions 705*a-e* with many fewer nodes than the examples of FIGS. 11 and 12.

One will recognize that the simplistic circle representing the LOS range of node 715*a* has been used here merely to facilitate understanding of the more limited LOS options at the lower elevation, and is not depicted as extending reciprocally to node 1330*a* atop the mountain in any of FIGS. 7-13 despite the reciprocal LOS regions of nodes 715*a* and 1330*a* (reciprocal overlaps for nodes 1330*b* and 1330*c* with node 1330*a* also are not depicted). Indeed, in an implemented embodiment the LOS regions associated with each node may be complicated three-dimensional structures, rather than these simple 2D circles. The planning system may determine that the LOS region about a node is a "blob", rather than a portion of a geometric solid (such as a hemisphere) as a consequence of the local terrain. Absent terrain or weather considerations, however, the LOS region may resemble a hemisphere (or even as a sphere missing some region in its lower hemisphere, e.g., as may be the case for node 1330*a* atop the mountain 710). In the example of FIG. 13, however, the mountain would subtract a portion of the hemisphere LOS region about node 715*a*. However, the remaining portion of node 715*a*'s LOS region's hemisphere would still extend to the top of the mountain 710 so as to reach node 1330*a*. Thus the planning system may initially assume the maximum possible dimensions of LOS region 335, and then "carve out" local obstructions, or reduce the range 345 based on aggregate conditions (e.g., regions with consistently high humidity).

Accordingly, where these descriptive examples discuss placing candidate nodes along a span 630, one will understand that some embodiments will place candidate notes where the LOS region of the node in consideration intersects the ground plane. These points of intersection may be limited to an angle range corresponding to the span 630. For very complicated LOS region's the span 630 may be represented as a line path along the considered node's LOS region's intersection with the ground plane, rather than as an angle. The line path may be selected such that its center point coincides with a line extending from the considered node outward in the priority direction.

At each iteration, candidate nodes may be placed based upon, e.g.: the population centroids; environmental factors; permissions of land owners; power availability (solar, grid connections, etc.); access strength of neighbor nodes. Metric evaluations may consider similar, or the same, factors.

Node-Placement Planning—Coverage-Driven

Figure 14:
FIG. 14 is an example result of a coverage-driven growth criterion on a node-placement-process as may occur in some embodiments.

FIG. 14 is an example result of a coverage-driven growth criterion on a node-placement-process as may occur in some embodiments. In some embodiments, the planner may specify that "coverage" is to take priority over other factors when selecting priority directions. Accordingly, the system may generate node placements and select paths that provide maximum coverage as depicted in FIG. 14.

Figure 15:
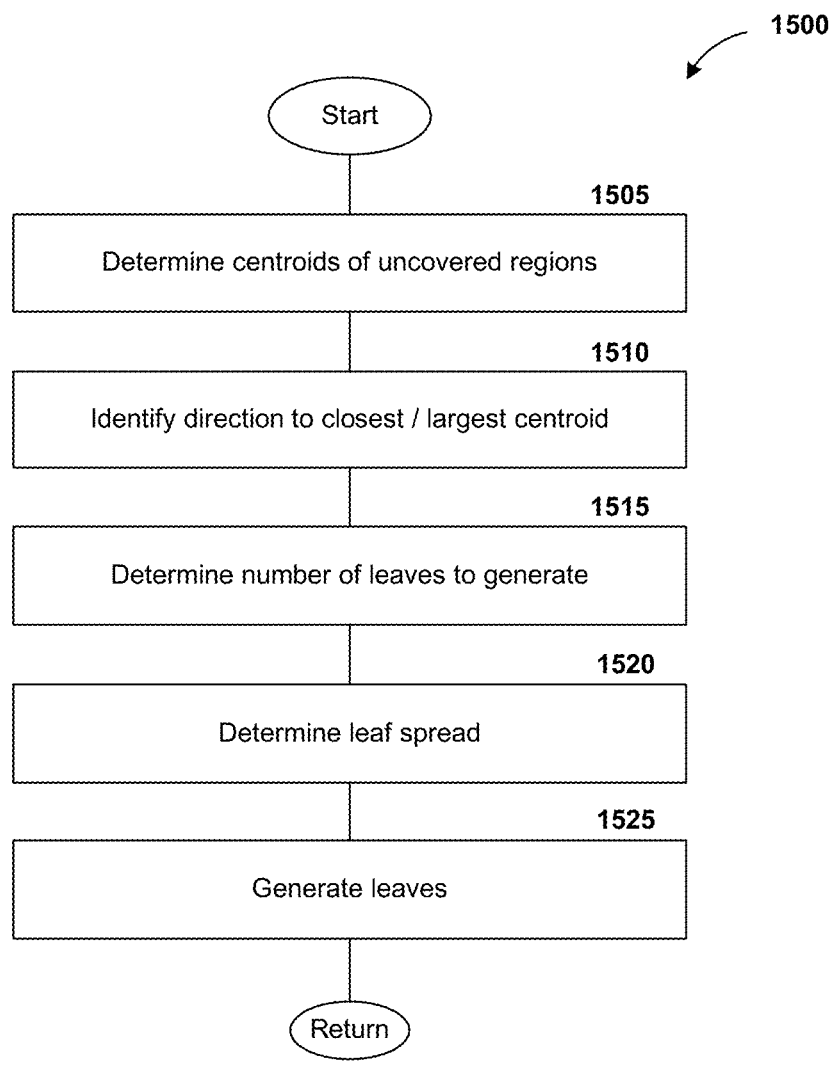
FIG. 15 is a flow diagram depicting a leaf generation process for a coverage-driven growth criterion in a node-placement-process as may occur in some embodiments.

FIG. 15 is a flow diagram depicting a leaf generation process for a coverage-driven growth criterion in a node-placement-process as may occur in some embodiments. At block 1505 the system may determine the centroids of the uncovered regions (e.g., regions not yet being serviced). For example, the regions may be construed as a Voronoi diagram, the centroids as the centers of the respective Voronoi region (generated, e.g., following a K-means clustering). At block 1510, the system may identify the direction to the closest and/or largest centroid for a particular leaf node under consideration. At block 1515 the system may determine the number of leaves to generate (e.g., the branching factor may vary depending upon the priority). At block 1520 the system may determine the leaf spread and at block 1525 the system may generate the new leaves.

Node-Placement Planning—Demand-Driven

Figure 16:
FIG. 16 is an example result of a demand-driven growth criterion on a node-placement-process as may occur in some embodiments.

FIG. 16 is an example result of a demand-driven growth criterion on a node-placement-process as may occur in some embodiments. In some embodiments, the planner may specify that "demand" is to take priority over other factors when selecting priority directions. Accordingly, the system may generate node placements and select paths that service the maximum number of individuals.

Figure 17:
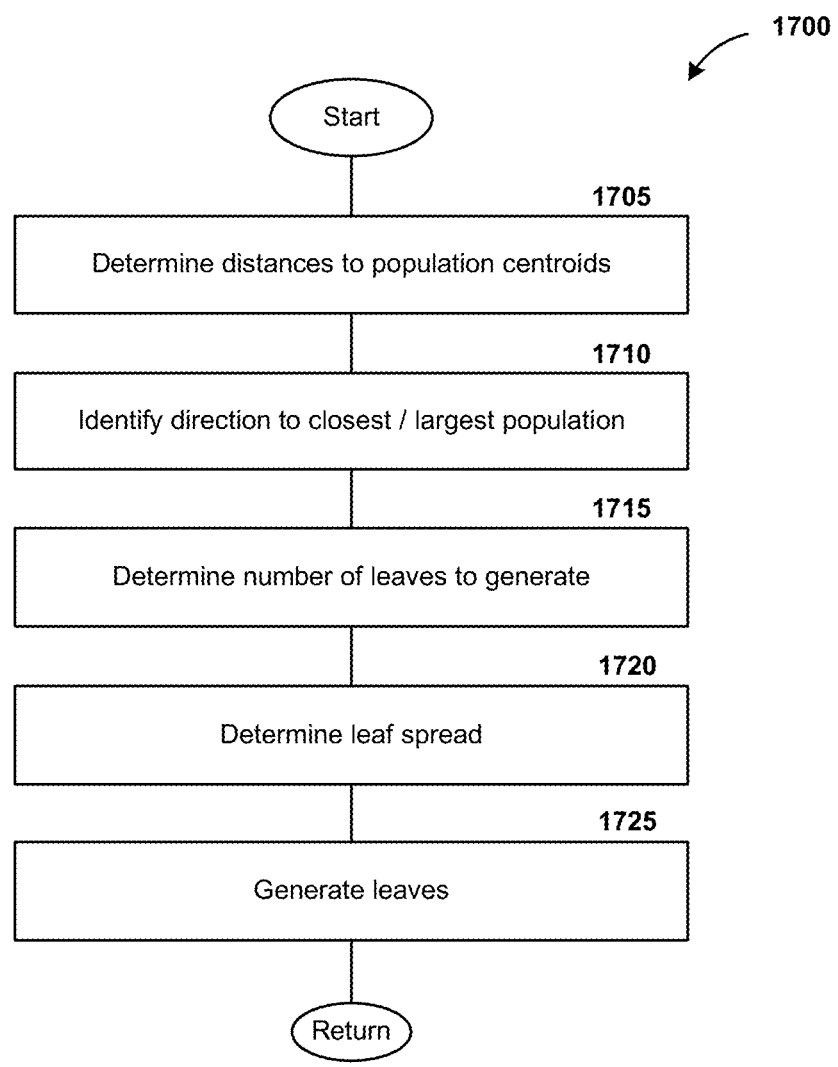
FIG. 17 is a flow diagram depicting a leaf generation process for a demand-driven growth criterion in a node-placement-process as may occur in some embodiments.

FIG. 17 is a flow diagram depicting a leaf generation process for a demand-driven growth criterion in a node-placement-process as may occur in some embodiments. At block 1705, the system may determine the distance to population centroids. For example, the populations may again be grouped based upon, e.g., a K-means or similar grouping method. At block 1710, the system may identify the direction to the nearest/largest population centroid for a leaf node under consideration. At block 1715, the system may determine the number of leaves to generate (e.g., the branching factor may vary depending upon the priority). At block 1720 the system may determine the leaf spread and at block 1725 the system may generate the new leaves.

Discovery and Alignment

After the planning phase has been completed, the nodes may be physically placed in the region at their determined positions. Following placement, the nodes may then locate their peers and form appropriate connections to achieve the desired level of service identified in the planning stage. The identification of neighboring peers is generally referred to as "Discovery" herein, the orientation to a peer as "Alignment", and the formation (via the first or subsequent orientations) of appropriate connections as determined during planning as "Association". For purposes of simplifying explanation, the following discussion of "Alignment", "Discovery" and "Association" will generally be with reference to a Cartesian layout, though one will readily recognize that his need not be the case and that other layouts may occur (e.g., a "Star" network as discussed herein). Different layouts may be generated as a result of the planning phase discussed above.

Figure 18:
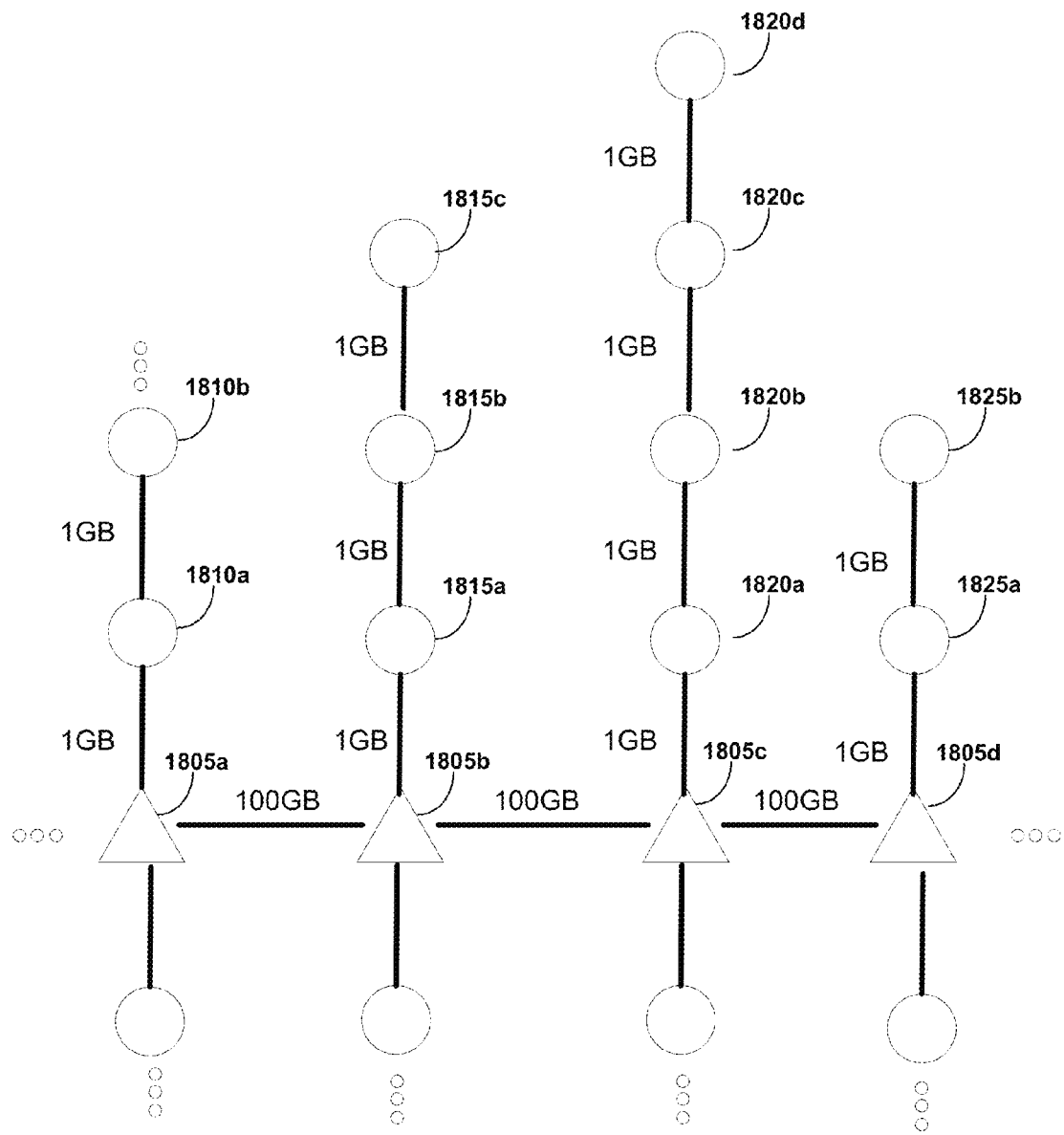
FIG. 18 is topological block diagram of node relations in a deployed Cartesian mesh following Discovery/Alignment and Association as may occur in some embodiments.

FIG. 18 is topological block diagram of node relations in a deployed Cartesian mesh following Discovery, Alignment, and Association, as may occur in some embodiments. Each of the columns may have been generated from a planning analysis beginning at a respective backbone connection. For example, the column comprising nodes 1815a-c may result from planning iterations beginning at backbone connections 1805b. As contemplated in some embodiments, and depicted in the above example, there may be 3 types of backhaul hardware: Fiber input (the connection of the network to the trunk); high speed hardware (e.g., 100 GB); and Regular speed (e.g., 1 GB).

Figure 19:
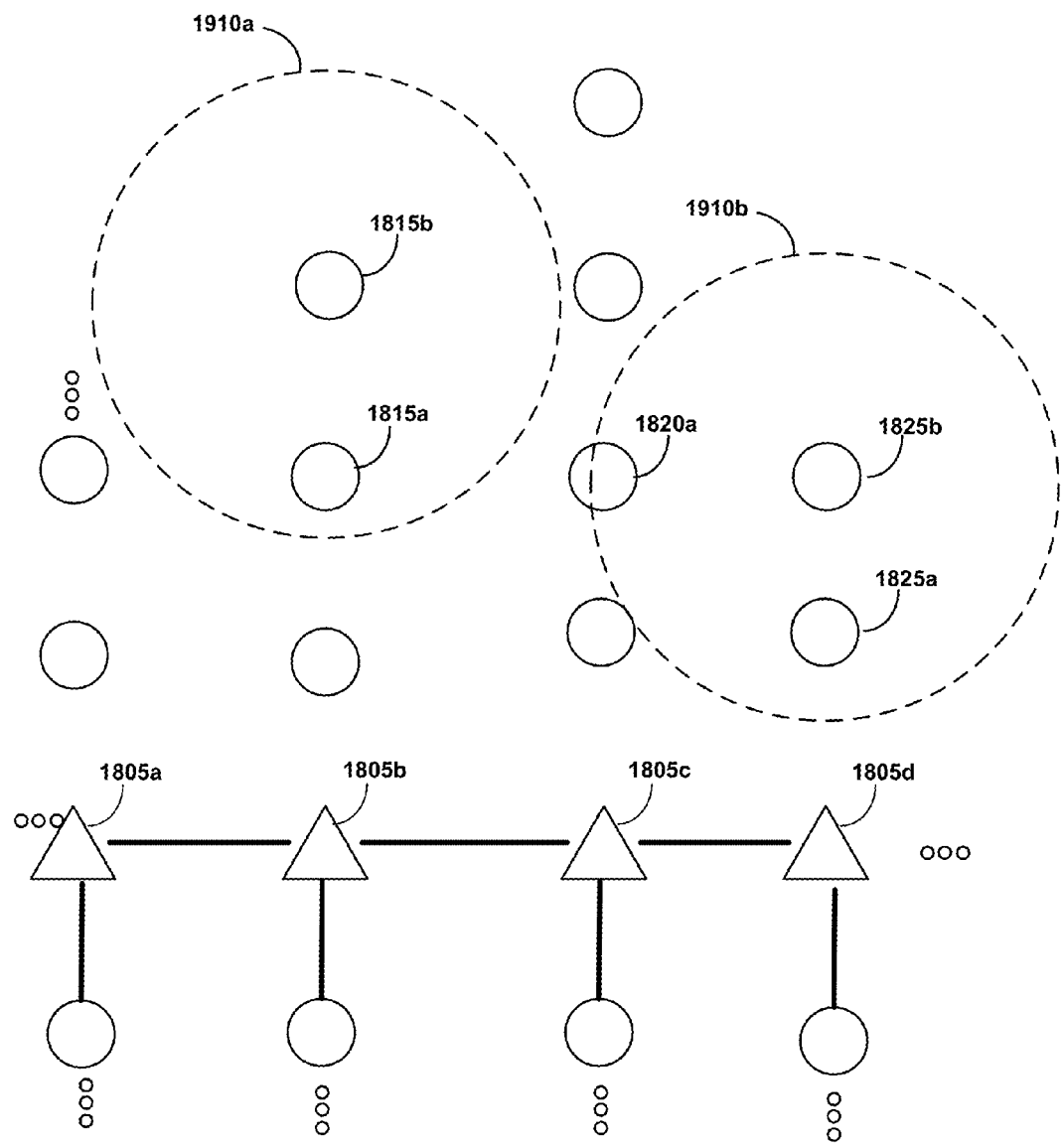
FIG. 19 is topological block diagram of node relations in a deployed Cartesian mesh prior to Discovery/Alignment as may occur in some embodiments.

FIG. 19 is topological block diagram of node relations in a deployed Cartesian mesh prior to Discovery/Alignment as may occur in some embodiments.

While FIG. 18 generally refers to the logical relation between nodes (i.e., their routing connections between one another) rather than their geographic location, FIG. 19 depicts ranges 1910a and 1910b reflecting the LOS for nodes 1815b and 1825b. During "Discovery", the node 1815b should recognize that the peer 1815a is within LOS range based upon their respective locations. Similarly, the node 1825b may recognize that each of peer nodes 1820a and 1825a are within LOS range. As there are multiple alternatives for node 1825b, during Alignment node 1825b may form a default connection with either (or in some embodiments, both) of nodes 1820a and 1825a. These default connections may be refined (e.g., supplemented or removed) subsequently during Association so as to achieve a desired connection with a backbone node.

Discovery—Passive User Propagation

In some embodiments, the nodes may determine their location information actively, e.g., by querying a GPS system or receiving coordinates from a technician on-site. In some embodiments, the installing technician may take an image of the node following installation, including one or two landmarks in the image. These landmarks may then be cross-referenced with database images to infer the location of the node. Some embodiments may combine various of these disclosed techniques to infer more accurate aggregate readings.

Figure 20:
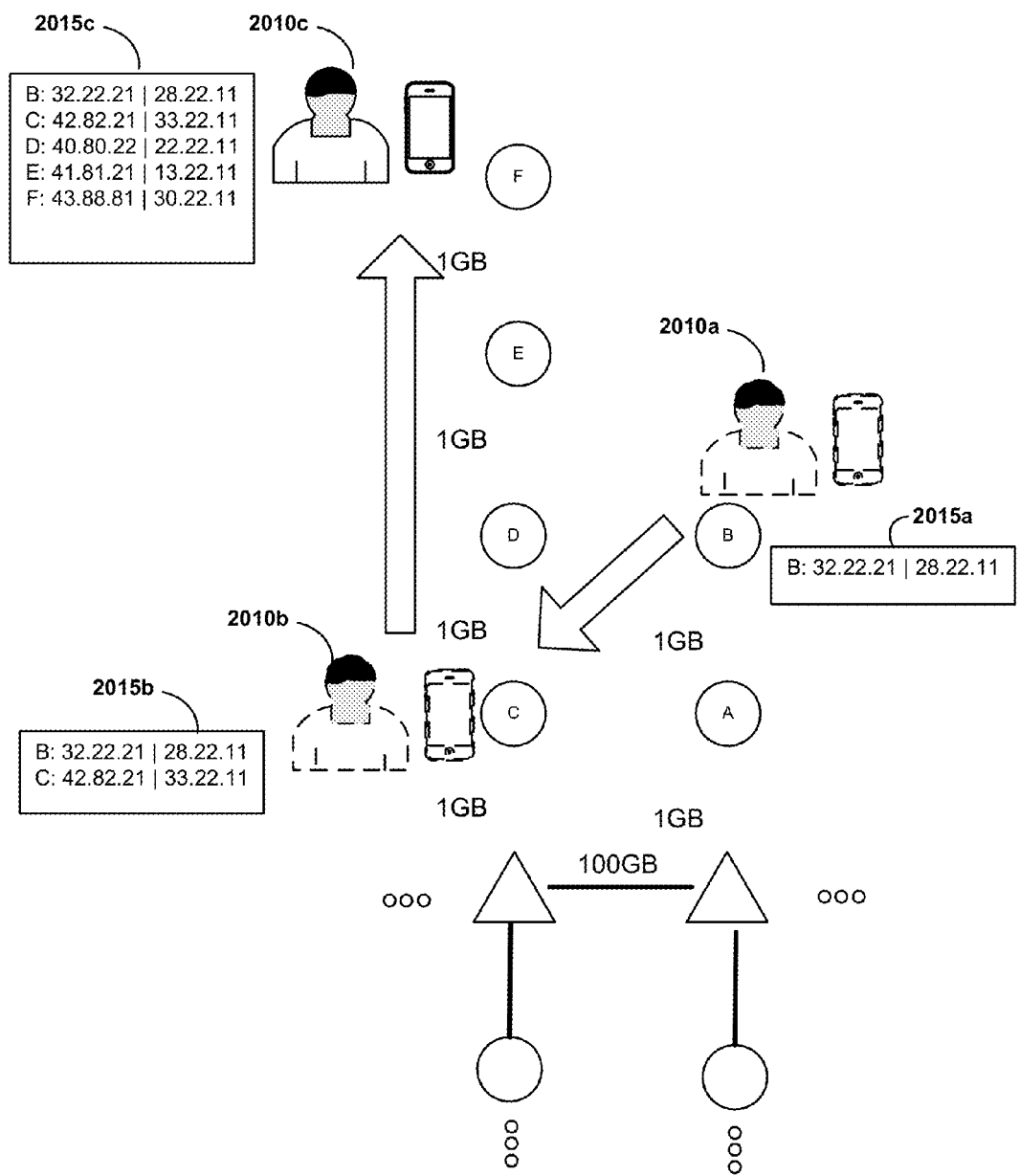
FIG. 20 is topological block diagram depicting passive user-based information propagation during Discovery/Alignment in a deployed Cartesian mesh as may occur in some embodiments.

In some embodiments, each node may also rely (in lieu of, in addition to, or in complementation with the other techniques) on the passive transfer of information by users between its peers. For example, FIG. 20 is topological block diagram depicting passive user-based information propagation during Discovery in a deployed Cartesian mesh as may occur in some embodiments. A user with a mobile device may move from position 2010a to position 2010b and then to position 2010c. Following installation, each of the nodes A-F may have local network access activated (e.g., WIFI) even though they are not yet in communication with a backbone connection. Accordingly as the user passes between the different nodes the user's mobile communication device may associate with each of the nodes. For example, the user may first pass node B which recognizes its GPS position as being "32.22.21|28.22.11" (node B may infer these coordinates from the user device's GPS coordinates). The mobile communication device may be running an application or otherwise be able to store this information locally in its memory in a location log 2015a. When the user arrives as position 2010b the mobile device may associate (e.g., form an 802.11 association) with Node C. The GPS positions values in this example are provided merely to facilitate understanding and do not reflect values that might actually be used in real-world implementations of embodiments.

Node C may pull the position log 2015a from the mobile device, make its own internal record of the position of Node B, and supplement the user's mobile device location log 2015b with its own location information, as well as any location not already present that it previously acquired. For example, had Node C previously encountered a user who had passed Node A, the location information for Node A would be included in the location log 2015b. By the time the user has reached position 2010c, the user has received and provided location information from and to each of Nodes D, E, and F.

Thus the user/subscribers may initially be given membership (802.11 authentication, etc.) to all of the node access points. For example, in a WIFI system this may be accomplished by providing a common SSID/password or by providing open access. As each user passes by an unconfigured node the access point subsystem sends a message to the user. The message may, e.g., contain the following information: the MAC address of the node (or other unique identifier); GPS coordinates of the node; Altimeter data from the node; the hardware types of the various node communication systems; and association information for the node (e.g., whether it is in communication with a backbone node as preferred by the planning process). The user device may store this information and subsequently convey it to a future encountered node.

By this mechanism, people randomly moving about may carry the locations of the nodes to the other nodes. Eventually, each node may have a complete list of all neighboring nodes.

Alignment—LOS Search Variations

In some embodiments, during Alignment the node may perform a random search with narrow beams, e.g., a small window 325. In these embodiments, the node may use a step size of one half the beam width (e.g., width of the window 325) and a dwell-time at least twice the time to step between two angles. For example, a beam steering system could take 5 ms to switch between two positions and dwell for 10 ms at each position. In the case of an RF beam width of 4 degrees, an angular step size of 2 degrees may be used. Each node would then search within 90*15=1350 steps in this example. For the node to detect a neighboring node in this example, both narrow beams may need to align which would take 1.82 million steps. With each step taking 15 ms the total time to align a pair of nodes may take 7.6 hours. A millimeter wave system with a 2 degree beam width and a step size of 1 degree may instead allow each node would search through 5400 steps. Detection would take 29.1 million steps, which would take 121 hours.

As another example, an optical system with a beam width of 0.2 degrees with a 0.1 degree step size would require each node to search through 540,000 steps. This alignment may take 291 billion steps and 138 years. The narrow beam random search approach is therefore generally considered herein for embodiments having wider beam widths.

Some embodiments employ random searches with wider beams (e.g., larger window 325). For example, some node embodiments use a separate signal with a wider beam for Alignment, but then use a narrower beam with higher speed data during normal operation. This wider beam signal could be used to narrow the search area for the narrow beam to its beam width.

In some embodiments, an omnidirectional receive antenna/sensor or omnidirectional transmit antenna/source may be connected to the node. This omnidirectional device may reduce the number of search steps of each node to the square root of the set time as it would not require that each node have exactly determined its relative alignment with its peer for the two to recognize one another.

Some embodiments implement a GPS-assisted search that may employ additional long-range wide area wireless technology. Each node may be fitted with an altimeter (e.g., using the barometric approach described herein) and GPS receiver to determine its position in space. The nodes may then share this information with neighboring peers to aid in alignment. An additional omnidirectional radio may also be used to share the information. The frequency and transmit power of this radio may be chosen to allow the signal to adequately reach the nearby nodes (e.g., as determined during the planning phase described above). Collision avoidance techniques may be performed and could be used to share the channel between the many nodes.

The GPS data may allow the node to confine the search region to the error band of its position data and the error band of the peer node's position data. This error may range from a worst case of 8 degrees in the horizontal plane at extremely close range (80 meters) and 1 degree in the Z axis to a worst case of 0.6 degrees in the horizontal at 10 km and 0.006 degrees in the Z axis. This may allow for a much faster search process during Alignment.

Some embodiments employ a GPS-assisted search using an access subsystem. These approaches may remove the need for an extra communication system solely for the purpose of alignment. For example, the access subsystem wireless range may allow the nodes to communicate directly with each other and to relay their address and coordinate information. As this information payload may be transmitted at a low data rate, it may be possible to use a lower bit rate (fewer bits/Hz) to pass the message.

Unfortunately, the access technology's range may render the GPS-assisted search using an access subsystem approach unfeasible in some situations. The limited range may prevent the passage of address and coordinate information to the neighboring nodes. In these situations, the passive transfer of peer information by users travelling between nodes as described herein may be used instead.

Alignment—Barometric Elevation Inference

Figure 21:
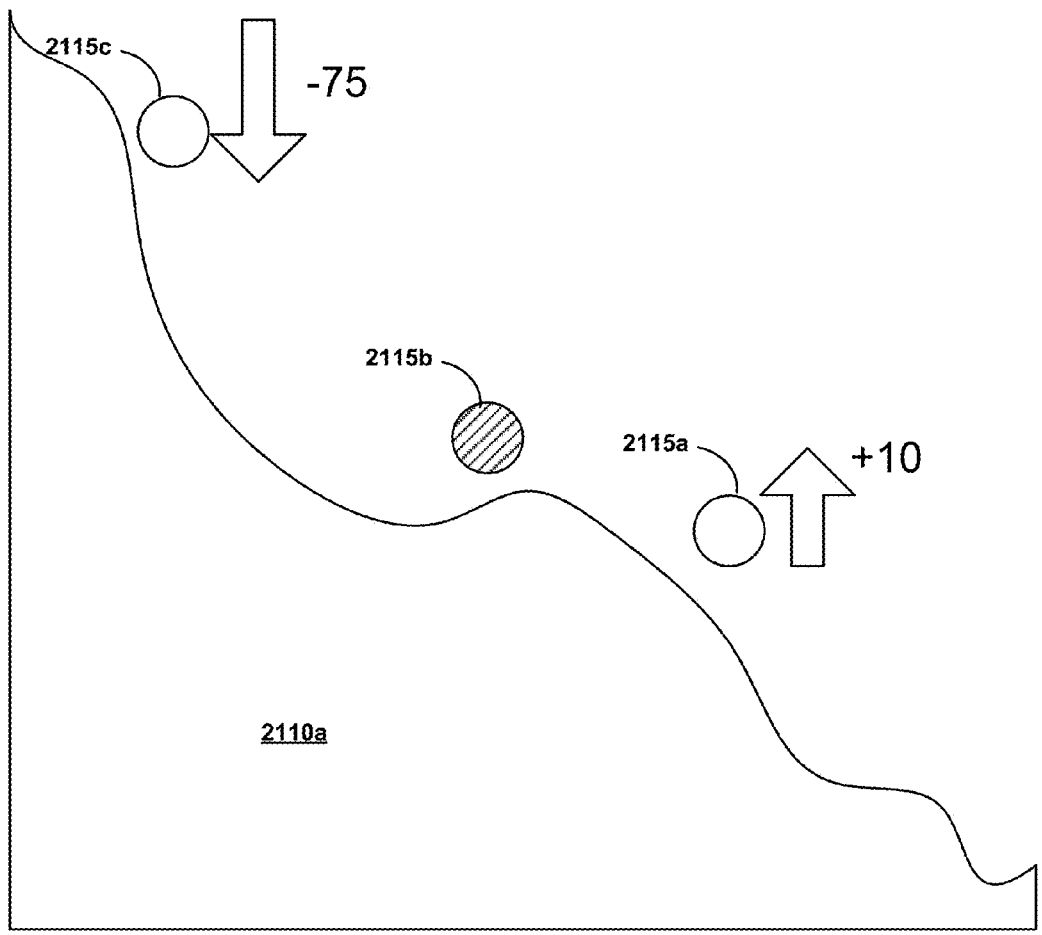
FIG. 21 is a cross-sectional perspective view of an incline upon which nodes are placed and relative barometric readings are taken as may occur in some embodiments.

In some embodiments the nodes may be able to infer their location exclusively from GPS information, information provided by an installing technician, etc. However, in some embodiments, position information may be inferred from a plurality of sources. In some embodiments, relative pressure information may be used by the nodes to complement GPS information so as to achieve more accurate determinations of the nodes' relative orientations. For example, FIG. 21 is a cross-sectional perspective view of an incline 2110a upon which nodes 2115a-c are placed and relative barometric readings are taken as may occur in some embodiments. The location logs, or other information transferred passively between the nodes, may include a barometric reading for a node. The nodes may compare the difference between their own barometric reading and the reading of a peer to infer the difference in elevation (and corresponding angle in which to scan the window). In this example, the node 2115a is at a slightly lower elevation relative to node 2115b. Accordingly, the pressure at node 2115a is higher than at node 2115b and a small, positive (+10) difference is noted. In contrast, node 2115c is located at a much higher elevation than node 2115b. Accordingly, the pressure at node 2115c is lower than at node 2115b and a large, negative (−75) difference is noted. The pressure to angle correspondence may be inferred from a table or determined dynamically.

Figure 22:
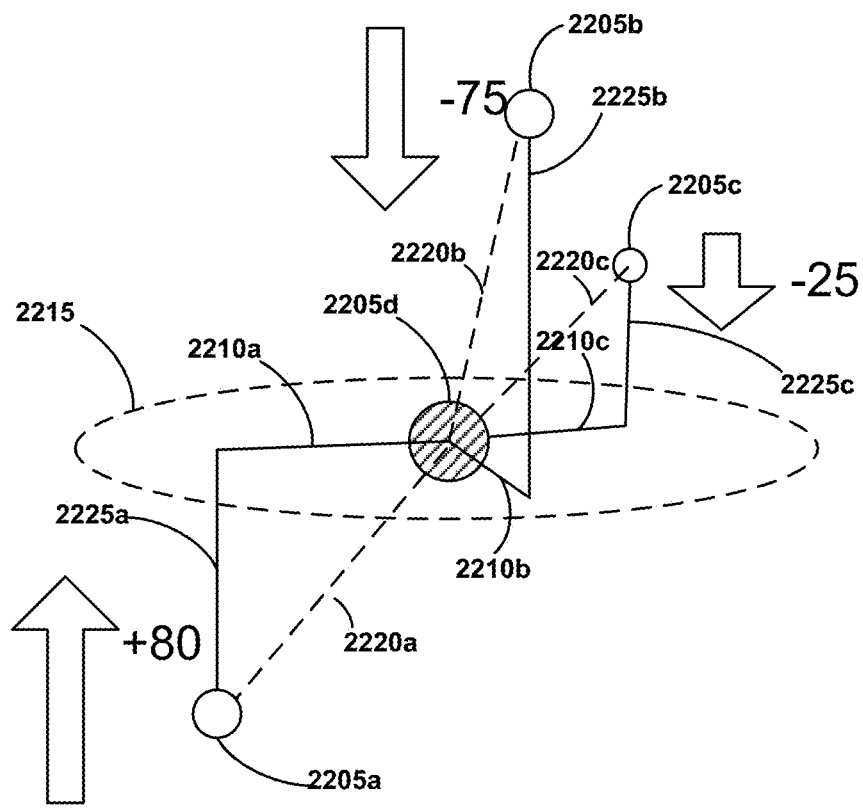
FIG. 22 is a three-dimensional perspective view of several nodes and their barometric readings relative to a first node as may occur in some embodiments.

FIG. 22 is a three-dimensional perspective view of several nodes 2205a-d and their barometric readings relative to a first node as may occur in some embodiments. Based on relative barometric readings and peer node locations relative to the terrestrial plane, each node may be able to infer a topological mapping of its local surroundings. For example, the node 2205d may recognize, based e.g., on GPS coordinates, that within the terrestrial plane 2215 (i.e., a plane perpendicular to a line passing from the node to the center of the Earth) it is a distance 2210a from the node 2205a, a distance 2210b from the node 2205b, and a distance 2210c from the node 2205c. There may be a relative pressure distance of +80, −75, and −25 for each of the respective nodes 2205a-c relative to node 2205d. From these differences, node 2205d may infer relative vertical heights 2225a-c for each of nodes 2205a-c. With the heights 2225a-c and distances 2210a-c known, the node 2205d may readily infer the Euclidean distance 2220a-c to each node and the corresponding angle relative to the terrestrial plane 2215.

Figure 23:
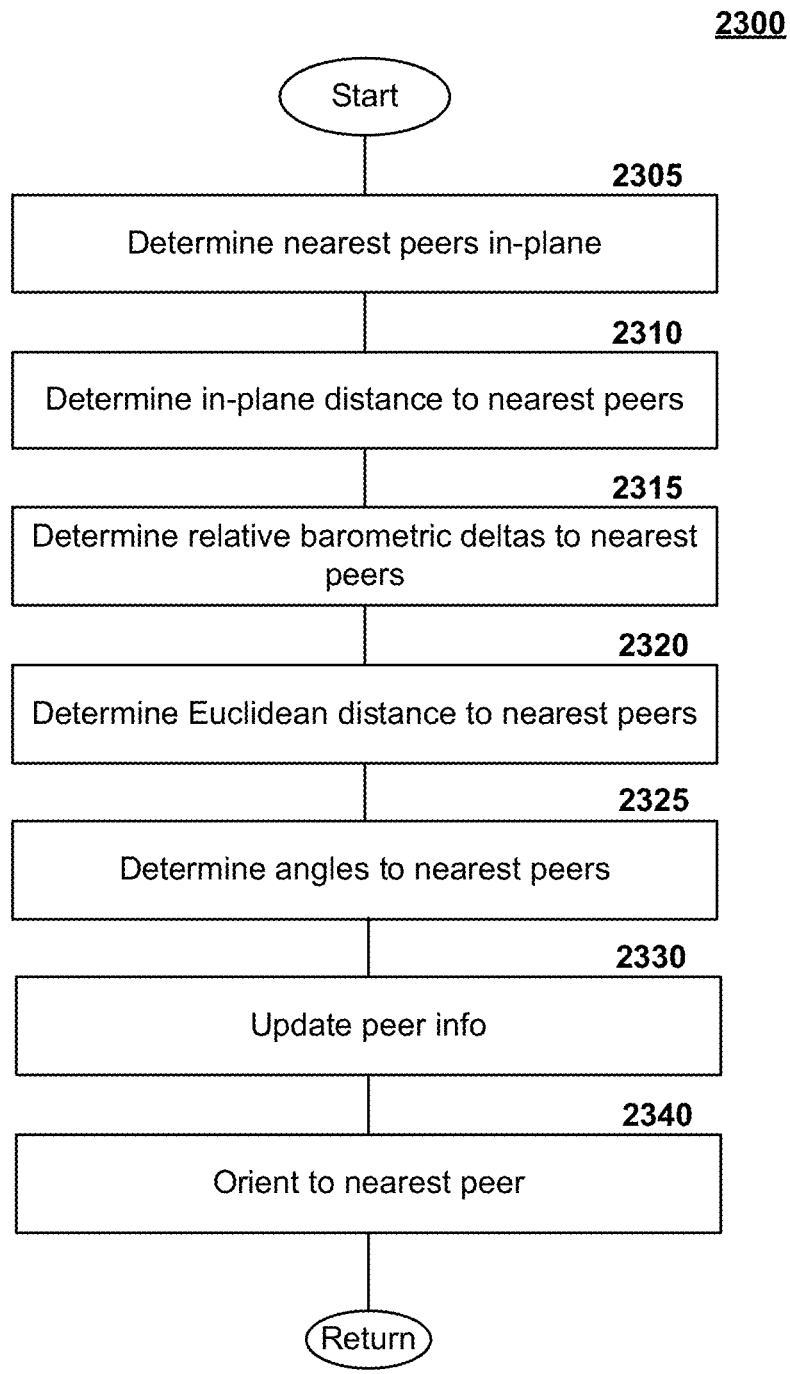
FIG. 23 is a flow diagram depicting a process for orienting peer-nodes during Alignment based upon their peers' barometric data as may occur in some embodiments.

FIG. 23 is a flow diagram depicting a process for orienting peer-nodes during Alignment based upon their peers' barometric data as may occur in some embodiments. At block 2305, the node may determine the peer nodes nearest in the terrestrial plane. At block 2310, the node may determine the in-plane distance to the peer. At block 2315, the node may determine the relative barometric deltas do the nearest peers and the corresponding height values. At block 2320, the node may determine the Euclidean distance to the nearest peers. At block 2325, the node may determine the angle to the nearest peers. At block 2330, the node may update its locally stored information regarding the nearest peers to reflect their relative positioning. At block 2340, the node may orient to the nearest peer, e.g., as part of a default connection prior to Association.

Association

In a system where each node has only enough communication links to reach some of its neighboring nodes, it may be very desirable for the system to choose the correct adjacent node to link to in accordance with the Planning phase. If the system additionally has communication links with different speeds, it may be especially preferred that the correct pairs of links (e.g., as specified in the Planning process) are established. The Association phase includes one or more processes for ensuring that appropriate links are formed.

The transition from the Alignment process to Association may occur based on one or more conditions, or may occur organically node-by-node as each acquires sufficient information regarding their peers. For example, in some embodiments each node may transition from the Alignment procedure to the Association procedure after a fixed period of time, after a sufficient amount of peer location information has been acquired, or upon some other signal.

Figure 24:
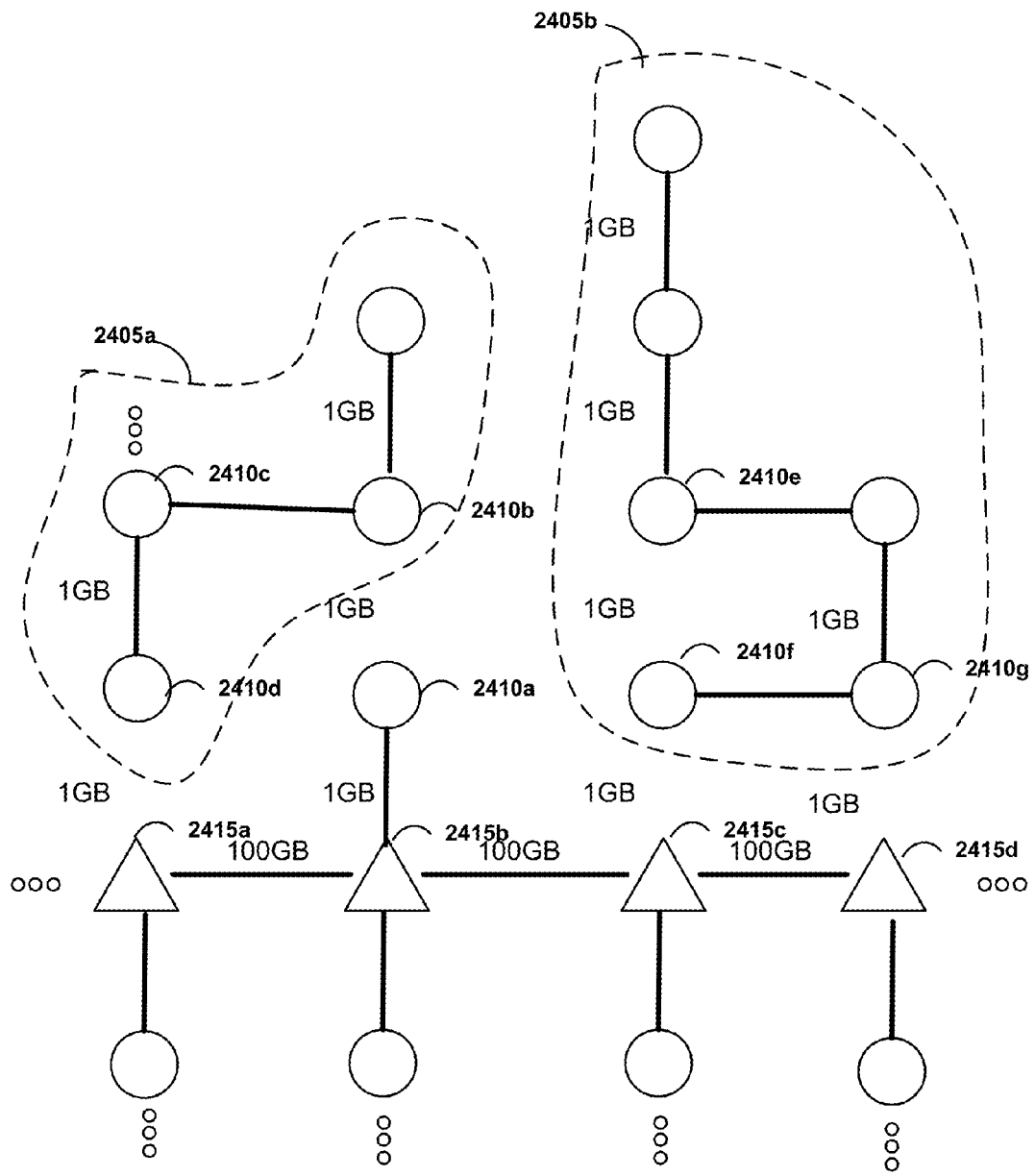
FIG. 24 is topological block diagram depicting isolated formations following Discovery/Alignment and prior to Association as may occur in a deployed Cartesian mesh in some embodiments.

Once Alignment completes, the default associations between nodes may not properly reflect the desired, planned association. FIG. 24 is topological block diagram depicting isolated formations following Alignment and prior to Association as may occur in a deployed Cartesian mesh in some embodiments. Isolated "island" networks 2405a,b have formed lacking a backbone connection, let alone the appropriate backbone connection determined during Planning. In this example, only node 2410a has properly associated with backbone connection 2415a as intended during Planning. While node 2410b may recognize both nodes 2410c and 2410a as being within LOS range, node 2410b may have formed a default association with node 2410c. Similar default reasoning may have resulted in node 2410d failing to associate with node 2415a, node 2410e failing to associated with node 2410f, and 2410f with backbone 2415c. As discussed herein, the nodes within isolated networks 2405a,b may recognize that they lack a connection with a backbone 2415b. Each node may share path information with its peers until a path to the backbone connection has been identified.

Figure 25:
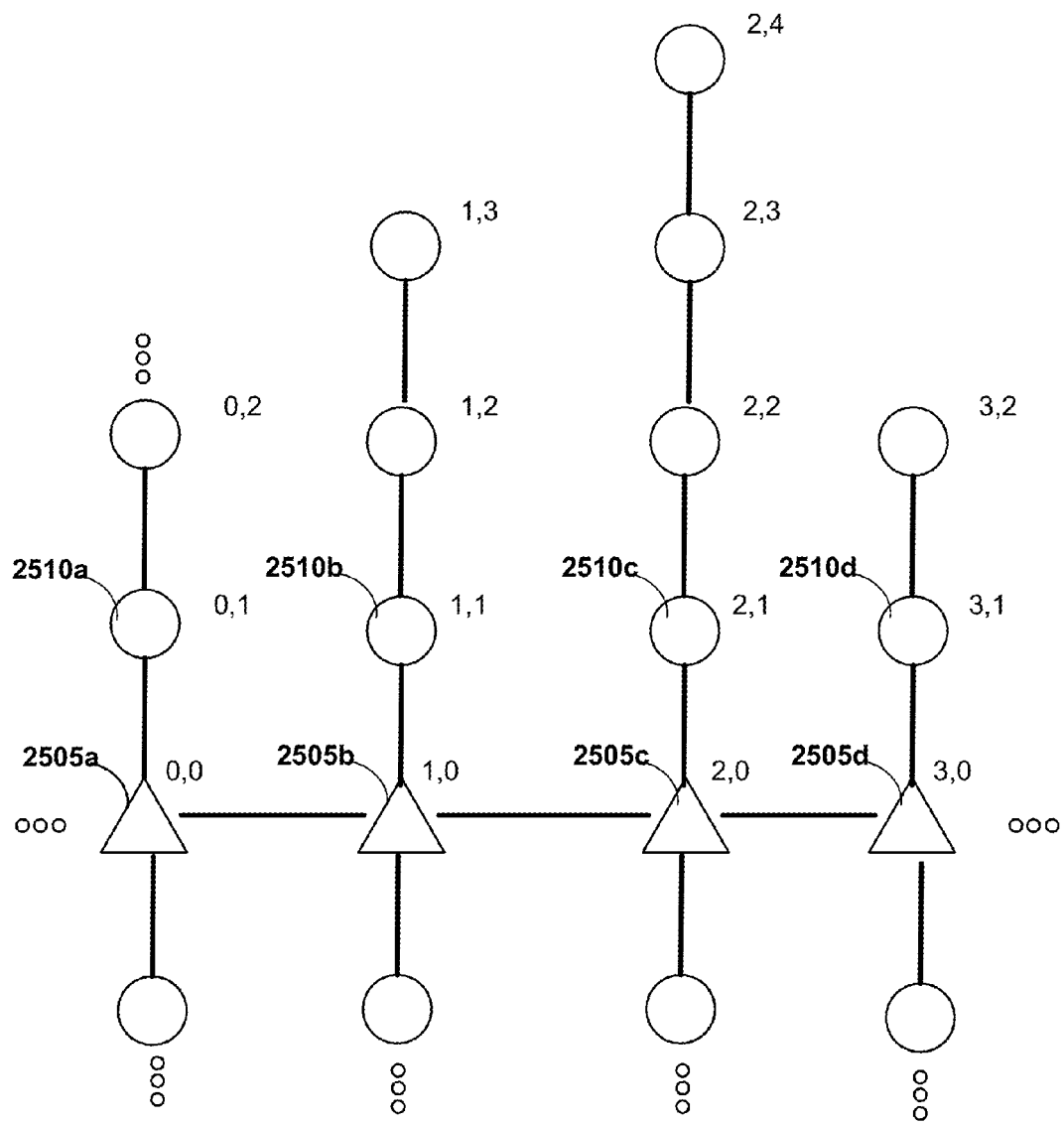
FIG. 25 is topological block diagram depicting an end ranking following Association as may occur in a deployed Cartesian mesh in some embodiments.

FIG. 25 is topological block diagram depicting an end ranking following Association as may occur in a deployed Cartesian mesh in some embodiments. In this example, each node is given a two part topological reference, referred to herein as a rank: (X,Y). The first part of the rank (X, the backbone component) represents the node's relation to the backbone (e.g., to a high speed network devices). The second part of the rank (Y, the subnetwork component) represents the node's relation to other nodes in the subnetwork (e.g., to the regular speed network devices). The relation may be, e.g., a number of hops from a backbone node associated with the subnetwork. The presence of a backbone input to a node's hardware may result in the node automatically assigning itself a rank of 0 for the backbone rank and 0 for the subnetwork rank. For example, initially nodes 2505a-d may have had rank 0,0. As they began communication with one another, they would select unique backbone rank identifiers as indicated. Nodes unconnected to the backbone may begin with an arbitrary, non-zero X rank (e.g., 9999).

A node 2505a with a hardcoded (0,0) rank may look through its list of neighboring node coordinates and determine which nodes are closest and have a rank of (X,0) where the X is any value (the nodes 2505b-d will assume other X ranks as knowledge of the node 2505a propagates). The node 2505a may retain this (0,0) ranking based on a hardcoded preference specified in the planning phase (e.g., a literal hardcoding by the installing technician, a rule established in the logic code, etc.). This node may then begin a search with its high speed optical heads (or whatever other communications module is available to the embodiment) in the direction of the neighboring nodes.

As the location of the (0,0) ranked node propagates among the other devices, the other devices will begin to search in the direction of the (0,0) node using the GPS coordinates of the (0,0) node. When a node finds the (0,0) node it may review the ranking information to determine if it falls within the subnetwork of the 0,0 node. If so, the node 2510a may update its rank to (1,0). The distance between nodes may govern the priority of assignment, resulting in there being eventually only one (1,0) ranked node 2505b on the backbone connected to the (0,0) node 2505a. This rank is updated in the broadcast message passed on to the neighboring nodes. Each other node with rank (X,0) then starts a search looking for node (1,0) until a link is made and the new node 2505c is given the rank (2,0) and so on.

In a similar manner, the regular speed node links closest to node 2505a may seek out the node with the (0,Y) where Y is any number (the preference for X being zero again based on a total ordering associated with distance). Each node which has been informed of a nearby node with a (0,Y) rank may begin a search of the coordinate area around the GPS coordinates of the node. The (0,Y) node may begin a search in the direction of the closest (X,Y) nodes. When a link is established the node 2510a-d updates its rank to (1,Y) and this rank is updated in the message shared with neighboring nodes. Other nodes without associated hardware that receive the message with a device with a (1,Y) node begin a search in the direction of the (1,Y) node and the process continues from there.

In the event a node determines that it has moved through a loss of connectivity or through a change in its GPS coordinates it may reset its rank to the defaults and allow/cause the process to begin again. Similarly, if a node detects a node with coordinates closer than a node of the appropriate rank, it may infer that a new node is present, or that a node has been moved. Consequently, the node may reset its rank allowing the search procedure to restart. Thus, in some embodiments the node Association process may proceed generally as follows: 1) From an initial start state (e.g., following installation or reset), every node selects a random rank between 1 and N where N is the number of nodes in the network, excluding node 0. Node 0 selects rank 0; 2) Each time a node receives a location list update (e.g., from a passing person, or from a neighbor node) it looks through the list to identify the location of the first known node with a higher rank and the first known node with a lower rank as given by the list; and 3) The node then attempts to connect first to the lower rank node (i.e. closer to node 0).

In this example, if the connection is successful, the node updates its rank to the rank of the node it connected to +1. It then attempts to connect to the higher ranked node. If the connection to the higher ranked node succeeds the node it connected to updates its rank to the connecting node's rank+1. For example, a node (arbitrarily referred to as "Node Z") with Y rank 5 receives a list that identifies the location of nodes with Y ranks 0, 2, 8, 10. Node Z first attempts to connect to the node with Y rank 2. If the connection is successful Node Z's Y rank is updated to rank 3. Node Z may attempt to connect to the node Y ranked 8 and if successful, the node Y ranked 8 updates its Y rank to 6 instead.

Figure 26:
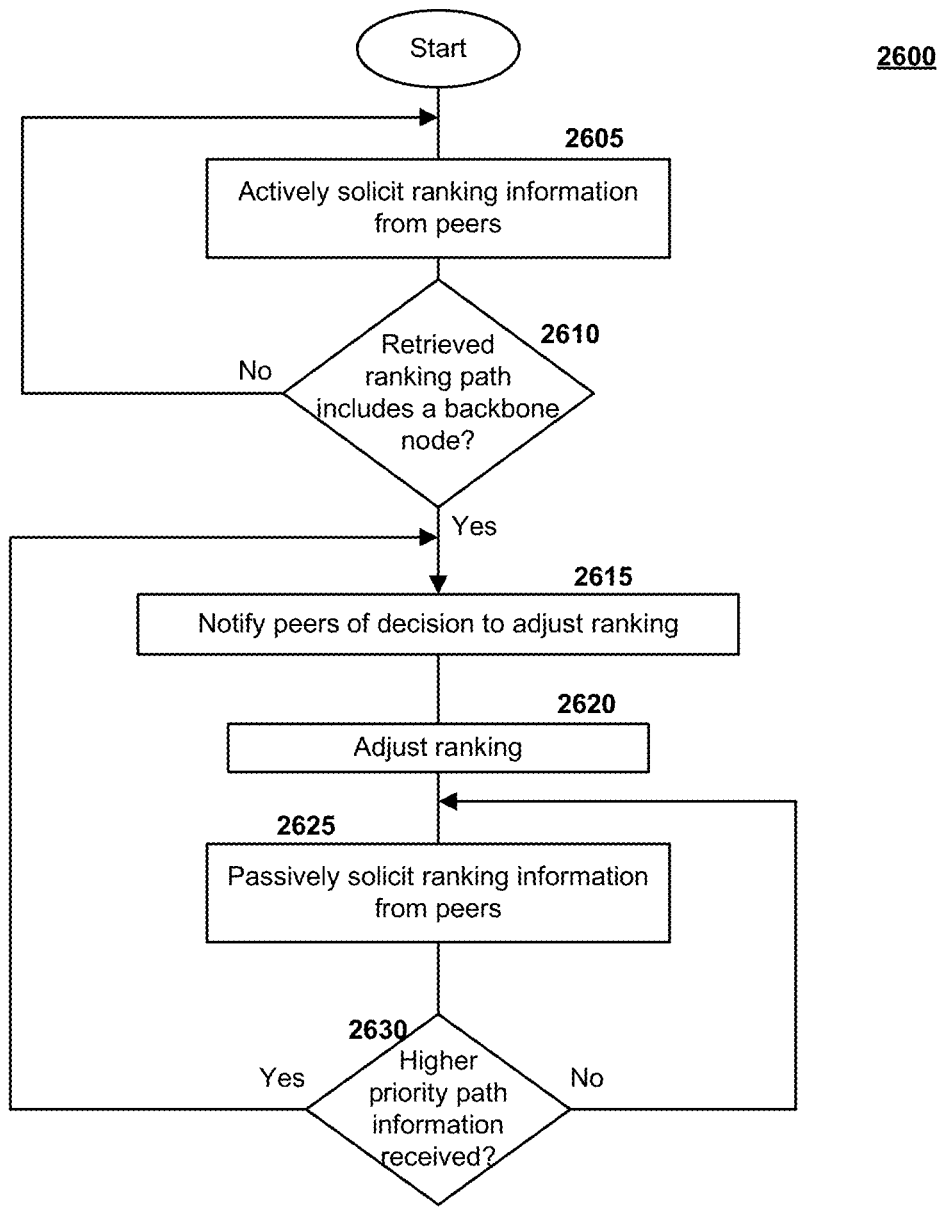
FIG. 26 is a flow diagram depicting a local process for updating a node ranking as may occur in some embodiments.

FIG. 26 is a flow diagram depicting a local process for updating a node ranking as may occur in some embodiments. At block 2605, the node may actively solicit ranking information from its peers. At block 2610, the node may determine if the acquired ranking information includes a backbone node. At block 2615, the node may notify its peers of the decision to adjust its ranking. At block 2620, the node may adjust its ranking. Subsequent requests for its ranking information will now include this new ranking. At block 2625, the node may passively solicit ranking information from its peers.

As discussed above, ranking information may backpropagate to the connection nodes on the backbone. The backbone nodes have knowledge of the desired network topology and may resubmit the ranking information into the network so as to accord with the preferred ranking. Accordingly, at block 2630 the node may determine if a higher prioritized path has been identified, e.g., as designated by a backbone node. If so, the ranking may be adjusted pursuant to blocks 2615 and 2620. If no higher priority information has been received, then the node may continue to passively listen for incoming ranking information.

Network Topology Variations

Figure 27:
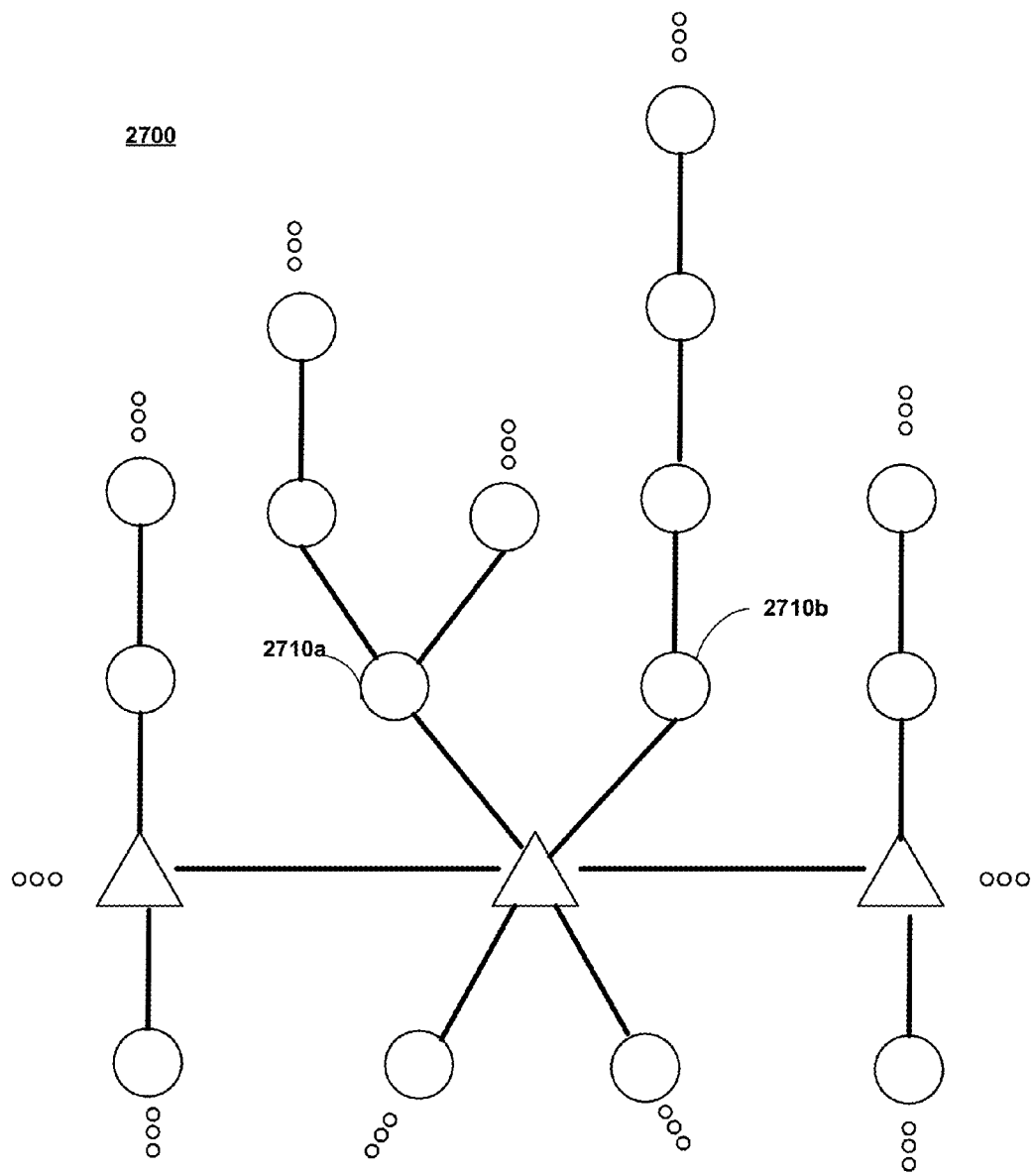
FIG. 27 is a topological block diagram depicting a Star-network following Discovery/Alignment as may occur in some embodiments.

FIG. 27 is a topological block diagram depicting a Star-network 2700 following Association as may occur in some embodiments. The planning phase may have imposed ranking conditions such that nodes 2710a,b either facilitate branching, or do not facilitate branching from the backbone node. As discussed herein, branching may be suitable at points of high elevation (buildings, mountains, etc.) and for nodes having many different communication components (e.g., more optical components and more memory).

Data Caching

Figure 28:
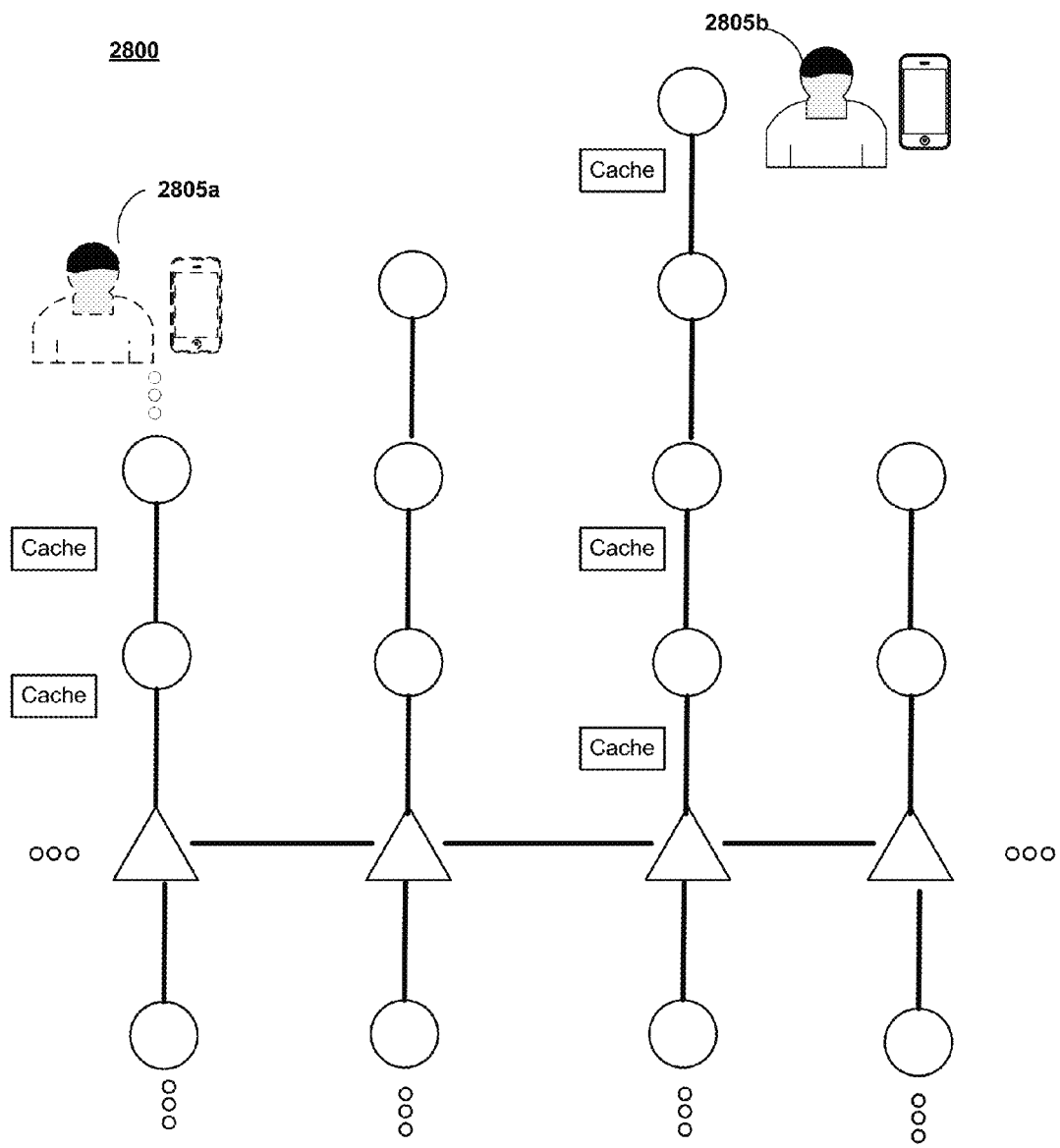
FIG. 28 is a topological block diagram depicting a caching topology in a Cartesian-network as may occur in some embodiments.

FIG. 28 is a topological block diagram depicting a caching topology in a Cartesian-network as may occur in some embodiments. During the planning phase, locations may be strategically determined where heavy usage or traffic may occur. At these strategic points, caching (or additional caching) memory may be provided to improve the network's efficiency during operation.

Routing Application

Figure 29:
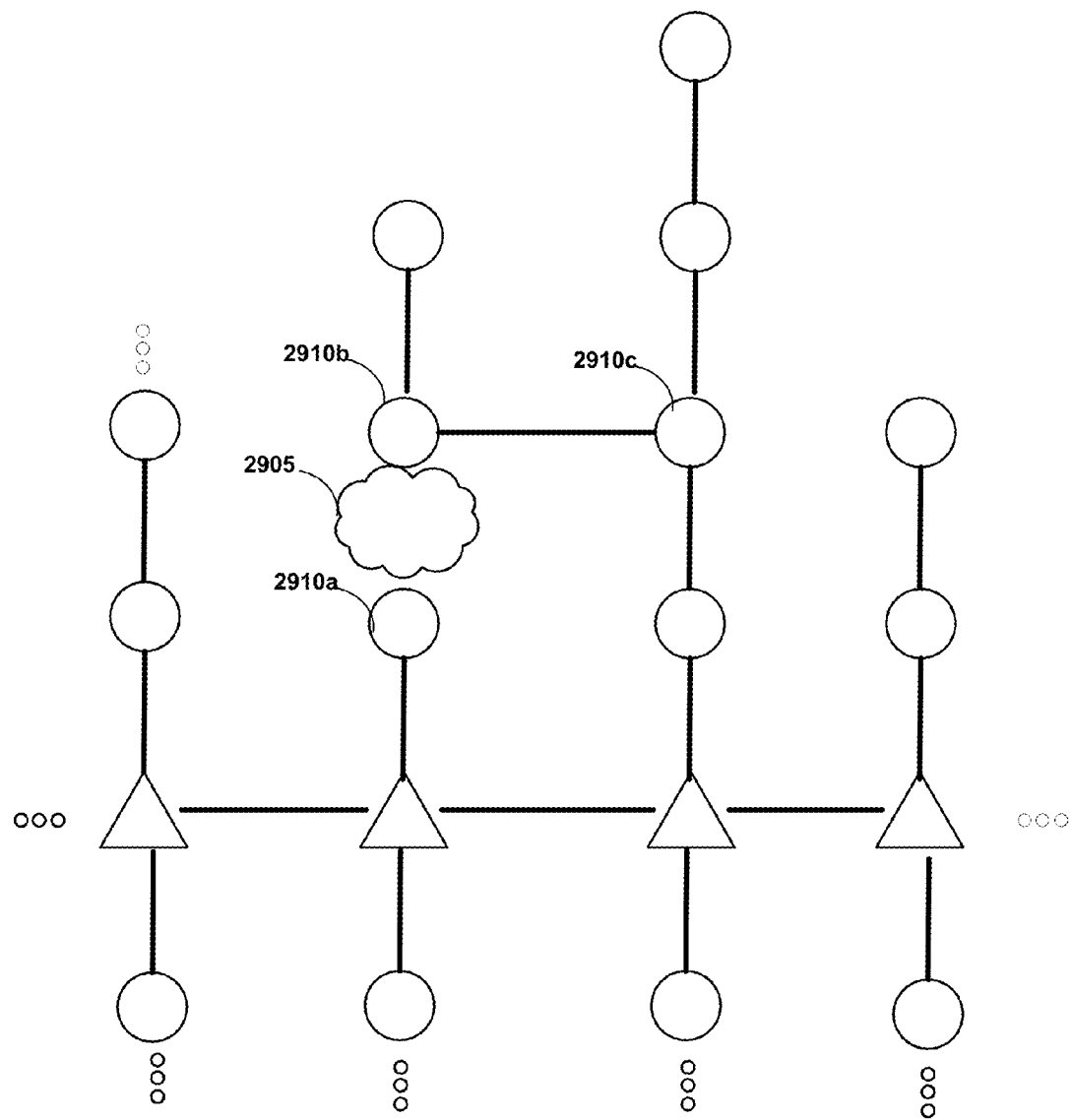
FIG. 29 is a topological block diagram depicting a rerouting event in a Cartesian-network as may occur in some embodiments.

FIG. 29 is a topological block diagram depicting a rerouting event in a Cartesian-network as may occur in some embodiments. For example, fog 2905 may form between the nodes 2910*a* and 2910*b*. During the planning phase, the anticipated weather patterns may be taken into consideration and alternative routing preferences included in the distributed nodes. For example, node 2910*a* may be redirected to form an optical connection with node 2910*c*. In some embodiments this rerouting may be performed dynamically, e.g., by restarting the Association process for the nodes disconnected from the backbone. In some embodiments, this Association process may differ from the original Association and may consider rerouting guidance provided from the planning phase. Routing adjustments may not only include the creation of new connections, but may instead include communication module changes. For example, fog 2905 may be impenetrable at optical wavelengths, but not a microwave wavelengths. Accordingly, nodes 2910*a* and 2910*b* may switch to another communication medium (e.g., microwave) until the condition abates.

Computer System

FIG. 30 is a block diagram of a computer system as may be used to implement features of some of the embodiments (e.g., as may be used to perform the Planning process or as may appear in the node 200). The computing system 3000 may include one or more central processing units ("processors") 3005, memory 3010, input/output devices 3025 (e.g., keyboard and pointing devices, display devices), storage devices 3020 (e.g., disk drives), and network adapters 3030 (e.g., network interfaces) that are connected to an interconnect 3015. The interconnect 3015 is illustrated as an abstraction that represents any one or more separate physical buses, point to point connections, or both connected by appropriate bridges, adapters, or controllers. The interconnect 3015, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 3010 and storage devices 3020 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 3010 can be implemented as software and/or firmware to program the processor(s) 3005 to carry out actions described above. In some embodiments, such software or firmware may be initially provided to the processing system 3000 by downloading it from a remote system through the computing system 3000 (e.g., via network adapter 3030).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method for generating network node placements, comprising:
   receiving real-world information for a target region;
   determining a first plurality of priority directions based upon the real-world information;
   generating a first set of node positions based upon the first plurality of priority directions and a position on the network backbone;
   determining a second plurality of priority directions based upon the real-world information, the first set of node positions, and a Line-of-Sight (LOS) range associated with the first set of node positions;
   generating a second set of node positions based upon the second plurality of priority directions;
   pruning the first set of node positions and the second set of node positions to generate a subset of the first set of node positions and the second set of node positions;
   determining a path comprising the subset of the first set of node positions and the second set of node positions, the path indicating network node placements; and
   placing candidate nodes at locations corresponding to the network node placements included in the subset of the first set of node positions and the second set of node positions.

2. The computer-implemented method of claim 1, wherein the real-world information for the target region comprises population information.

3. The computer-implemented method of claim 1, wherein the first set of node positions comprises a single node's position, and the second set of node positions comprises candidate child node positions placed along a span associated with the single node, a width of the span determined based on a location of a centroid calculated using the real-world information.

4. The computer-implemented method of claim 1, wherein the path is one of a plurality of paths determined based on pruning the first set of node positions and the second set of node positions.

5. The computer-implemented method of claim 4, wherein the plurality of paths are associated with metric values and form subpaths, wherein the metric values are based on one or more constraints associated with the real-world information.

6. The computer-implemented method of claim 1, further comprising generating topology information associated with the path, the topology information indicating communication devices to be included in nodes of the path.

7. The computer-implemented method of claim 6, wherein the topology information comprises caching capabilities associated with nodes in the path.

8. The computer-implemented method of claim 6, wherein the topology information comprises rerouting information associated with nodes in the path.

9. A non-transitory computer-readable storage medium storing instructions configured to cause a computer system to perform a method comprising:
   receiving real-world information for a target region;
   determining a first plurality of priority directions based upon the real-world information;
   generating a first set of node positions based upon the first plurality of priority directions and a position on the network backbone;
   determining a second plurality of priority directions based upon the real-world information, the first set of node positions, and a Line-of-Sight (LOS) range associated with the first set of node positions;
   generating a second set of node positions based upon the second plurality of priority directions;
   pruning the first set of node positions and the second set of node positions to generate a subset of the first set of node positions and the second set of node positions;
   determining a path comprising a subset of the first set of node positions and the second set of node positions, the path indicating network node placements; and
   placing candidate nodes at locations corresponding to the network node placements included in the subset of the first set of node positions and the second set of node positions.

10. The computer-readable storage medium of claim 9, wherein the real-world information for the target region comprises population information.

11. The computer-readable storage medium of claim 9, wherein the first set of node positions comprises a single node's position, and the second set of node positions comprises candidate child node positions placed along a span associated with the single node, a width of the span determined based on a location of a centroid calculated using the real-world information.

12. The computer-readable storage medium of claim 9, wherein the path is one of a plurality of paths determined based on pruning the first set of node positions and the second set of node positions.

13. The computer-readable storage medium of claim 12, wherein the plurality of paths are associated with metric values and form subpaths, wherein the metric values are based on one or more constraints associated with the real-world information.

14. The computer-readable storage medium of claim 9, the instructions further comprising generating topology information associated with the path, the topology information indicating communication devices to be included in nodes of the path.

15. The computer-readable storage medium of claim 14, wherein the topology information comprises caching capabilities associated with nodes in the path.

16. The computer-readable storage medium of claim 14, wherein the topology information comprises rerouting information associated with nodes in the path.

17. A computer system comprising:
   at least one processor;
   at least one memory comprising instructions configured to cause the at least one processor to perform a method comprising:
      receiving real-world information for a target region;
      determining a first plurality of priority directions based upon the real-world information;
      generating a first set of node positions based upon the first plurality of priority directions and a position on the network backbone;
      determining a second plurality of priority directions based upon the real-world information, the first set of node positions, and a Line-of-Sight (LOS) range associated with the first set of node positions;
      generating a second set of node positions based upon the second plurality of priority directions;

pruning the first set of node positions and the second set of node positions to generate a subset of the first set of node positions and the second set of node positions;

determining a path comprising the subset of the first set of node positions and the second set of node positions, the path indicating network node placements; and placing candidate nodes at locations corresponding to the network node placements included in the subset of the first set of node positions and the second set of node positions.

18. The computer system of claim 17, wherein the real-world information for the target region comprises population information.

19. The computer system of claim 17, wherein the first set of node positions comprises a single node's position, and the second set of node positions comprises candidate child node positions placed along a span associated with the single node, a width of the span determined based on a location of a centroid calculated using the real-world information.

20. The computer system of claim 17, wherein the path is one of a plurality of paths determined based on pruning the first set of node positions and the second set of node positions.

21. The computer system of claim 20, wherein the plurality of paths are associated with metric values and form subpaths, wherein the metric values are based on one or more constraints associated with the real-world information.

22. The computer system of claim 17, further comprising generating topology information associated with the path, the topology information indicating communication devices to be included in nodes of the path.

23. The computer system of claim 22, wherein the topology information comprises caching capabilities associated with nodes in the path.

24. The computer-readable storage medium of claim 22, wherein the topology information comprises rerouting information associated with nodes in the path.

* * * * *